(12) United States Patent
Vasseur et al.

(10) Patent No.: US 11,343,171 B2
(45) Date of Patent: *May 24, 2022

(54) USING A FLAPPINESS METRIC TO LIMIT TRAFFIC DISRUPTION IN WIDE AREA NETWORKS

(71) Applicant: Cisco Technology, Inc., San Jose, CA (US)

(72) Inventors: Jean-Philippe Vasseur, Saint Martin D'uriage (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,399

(22) Filed: Apr. 23, 2020

(65) Prior Publication Data

US 2021/0336871 A1    Oct. 28, 2021

(51) Int. Cl.
| | |
|---|---|
| *H04L 12/707* | (2013.01) |
| *H04L 45/00* | (2022.01) |
| *H04L 47/80* | (2022.01) |
| *H04L 47/70* | (2022.01) |
| *H04L 45/302* | (2022.01) |

(52) U.S. Cl.
CPC ............ *H04L 45/22* (2013.01); *H04L 45/302* (2013.01); *H04L 47/805* (2013.01); *H04L 47/825* (2013.01)

(58) Field of Classification Search
CPC ..... H04L 41/147; H04L 45/08; H04L 45/302; H04L 47/825; H04L 45/22; H04L 47/805
See application file for complete search history.

(56) References Cited

U.S. PATENT DOCUMENTS

| | | | |
|---|---|---|---|
| 6,802,020 B1* | 10/2004 | Smith ................. | G06F 11/2257 714/4.2 |
| 9,590,892 B2 | 3/2017 | Shah Heydari et al. | |
| 9,774,522 B2* | 9/2017 | Vasseur .................. | H04L 45/02 |
| 10,389,613 B2 | 8/2019 | Dasgupta et al. | |
| 10,581,736 B1* | 3/2020 | Choudhury ............. | H04L 41/14 |
| 10,924,393 B2* | 2/2021 | Vasseur ................. | H04L 47/825 |

(Continued)

OTHER PUBLICATIONS

Vasseur, et al., "Securing Your Network with Anomaly Detection Using Distributed Learning Architecture (Learning Networks)", online: https://www.cisco.com/c/dam/m/en_us/service-provider/ciscoknowledgenetwork/files/Techad-SLN-Jan2017.pdf, Jan. 2017, 39 pages, Cisco.com.

(Continued)

*Primary Examiner* — Jeong S Park
(74) *Attorney, Agent, or Firm* — Behmke Innovation Group LLC; Kenneth J. Heywood; Jonathon P. Western

(57) ABSTRACT

In one embodiment, a device in a network obtains tunnel flappiness metrics associated with a particular tunnel in the network exhibiting flapping. The device makes, based on the tunnel flappiness metrics, a prediction that the particular tunnel is going to flap. The prediction is made using a machine learning model. The device proactively reroutes, based on the prediction, traffic from the particular tunnel onto an alternate tunnel, prior to the particular tunnel flapping. The device evaluates performance of the alternate tunnel, after proactively rerouting the traffic from the particular tunnel onto the alternate tunnel.

20 Claims, 18 Drawing Sheets

(56) References Cited

U.S. PATENT DOCUMENTS

| | | | |
|---|---|---|---|
| 11,032,181 B2* | 6/2021 | Vasseur | H04L 41/0663 |
| 2013/0010610 A1 | 1/2013 | Karthikeyan et al. | |
| 2015/0195192 A1* | 7/2015 | Vasseur | G06F 11/2007 |
| | | | 714/47.3 |
| 2015/0222557 A1* | 8/2015 | Bhattacharya | H04L 41/00 |
| | | | 370/237 |
| 2018/0026891 A1* | 1/2018 | Vasseur | H04L 47/127 |
| | | | 370/235 |
| 2019/0068512 A1 | 2/2019 | Papaloukopoulos et al. | |
| 2019/0207844 A1* | 7/2019 | Kodavanty | H04L 12/4633 |
| 2021/0160148 A1* | 5/2021 | Kolar | H04L 12/2854 |

OTHER PUBLICATIONS

Wright, et al., "Learning to Win: Making the Case for Autonomous Cyber Security Solutions", online: https://www.csiac.org/csiac-report/learning-to-win-making-the-case-for-autonomous-cyber-security-solutions/, Aug. 2018, 22 pages, CSIAC Reports.

\* cited by examiner

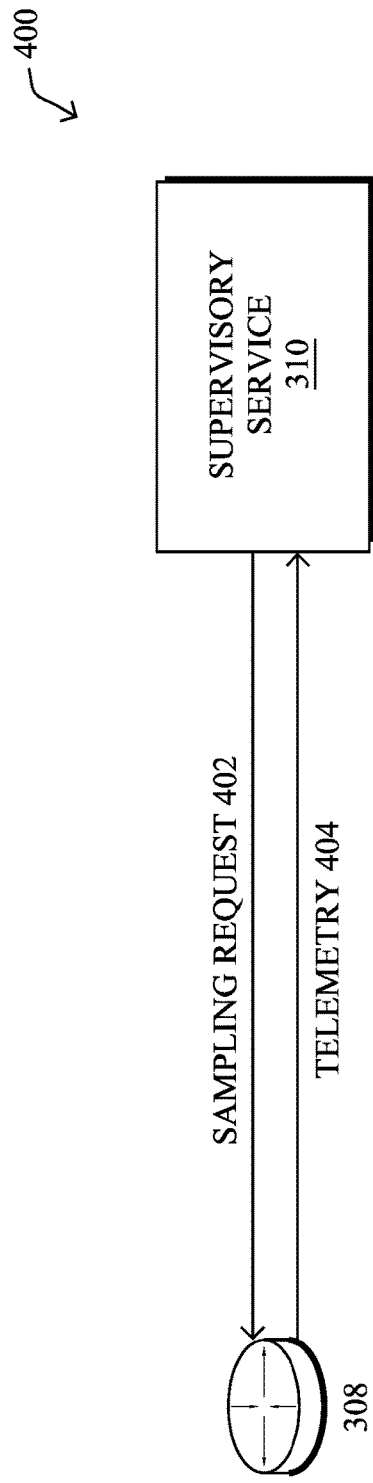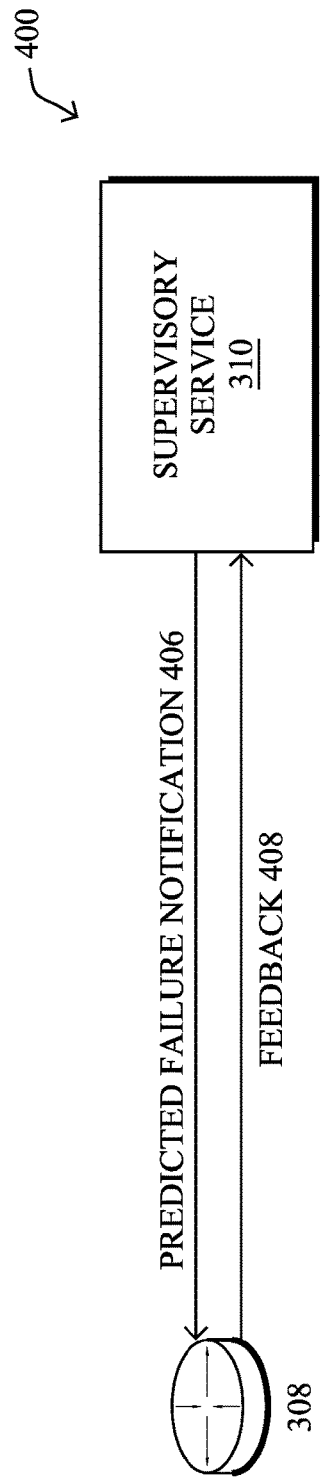
FIG. 4A
FIG. 4B

USING A FLAPPINESS METRIC TO LIMIT TRAFFIC DISRUPTION IN WIDE AREA NETWORKS

TECHNICAL FIELD

The present disclosure relates generally to computer networks, and, more particularly, to using a floppiness metric to limit traffic disruption in wide area networks (WANs).

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

With the recent evolution of machine learning, predictive failure detection and proactive routing in an SD-WAN now becomes possible through the use of machine learning techniques. However, simply predicting that a tunnel will fail is not enough to guarantee improved network performance. Indeed, some tunnels exhibit flapping behavior in which the tunnel oscillates between down and up states.

BRIEF DESCRIPTION OF THE DRAWINGS

FIGS. 4A-4C illustrate examples of feedback for failure predictions.

DESCRIPTION OF EXAMPLE EMBODIMENTS

Overview

Figure 1A:
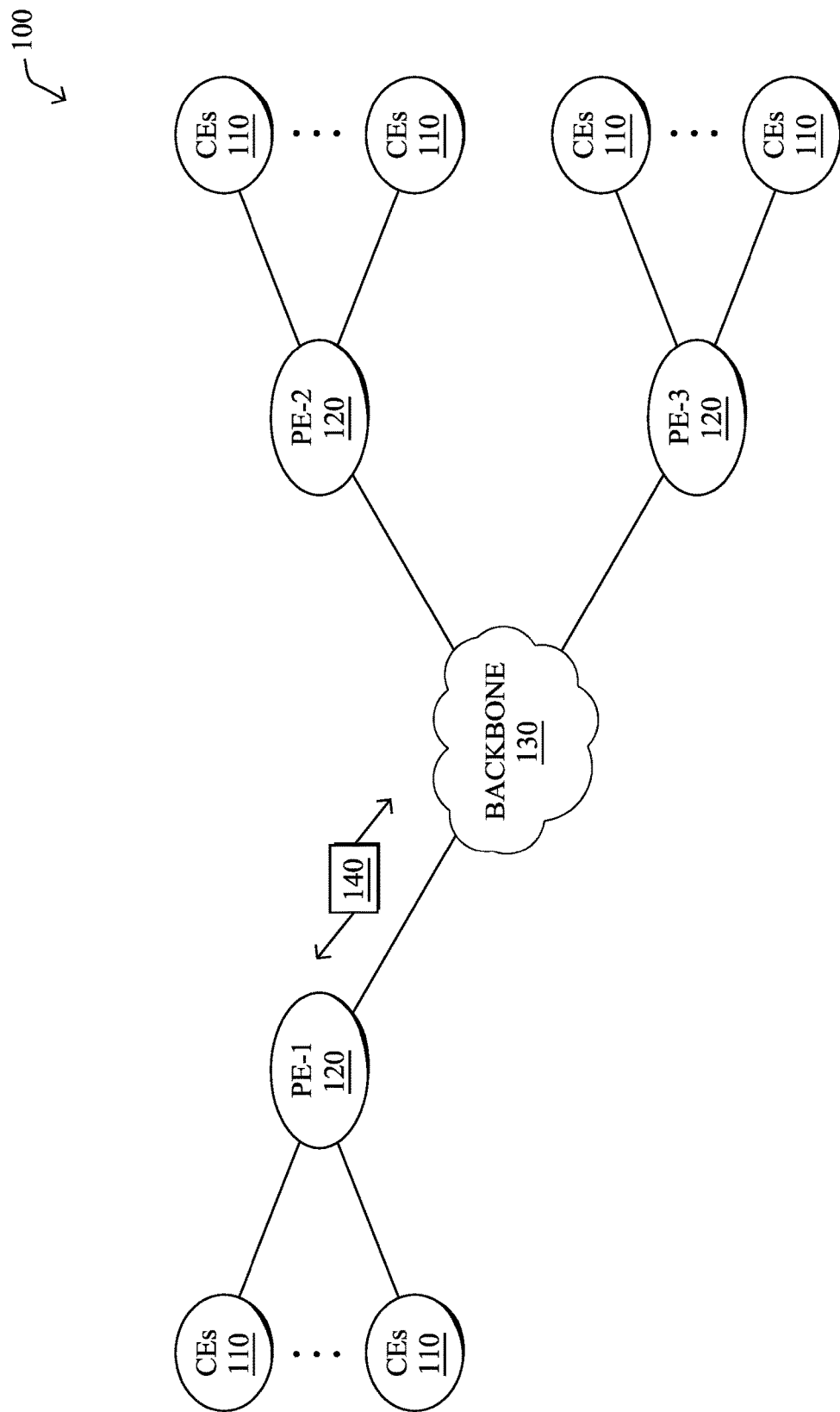
FIGS. 1A-1B illustrate an example computer network.

According to one or more embodiments of the disclosure, a device in a network obtains tunnel flappiness metrics associated with a particular tunnel in the network exhibiting flapping. The device makes, based on the tunnel flappiness metrics, a prediction that the particular tunnel is going to flap. The prediction is made using a machine learning model. The device proactively reroutes, based on the prediction, traffic from the particular tunnel onto an alternate tunnel, prior to the particular tunnel flapping. The device evaluates performance of the alternate tunnel, after proactively rerouting the traffic from the particular tunnel onto the alternate tunnel.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
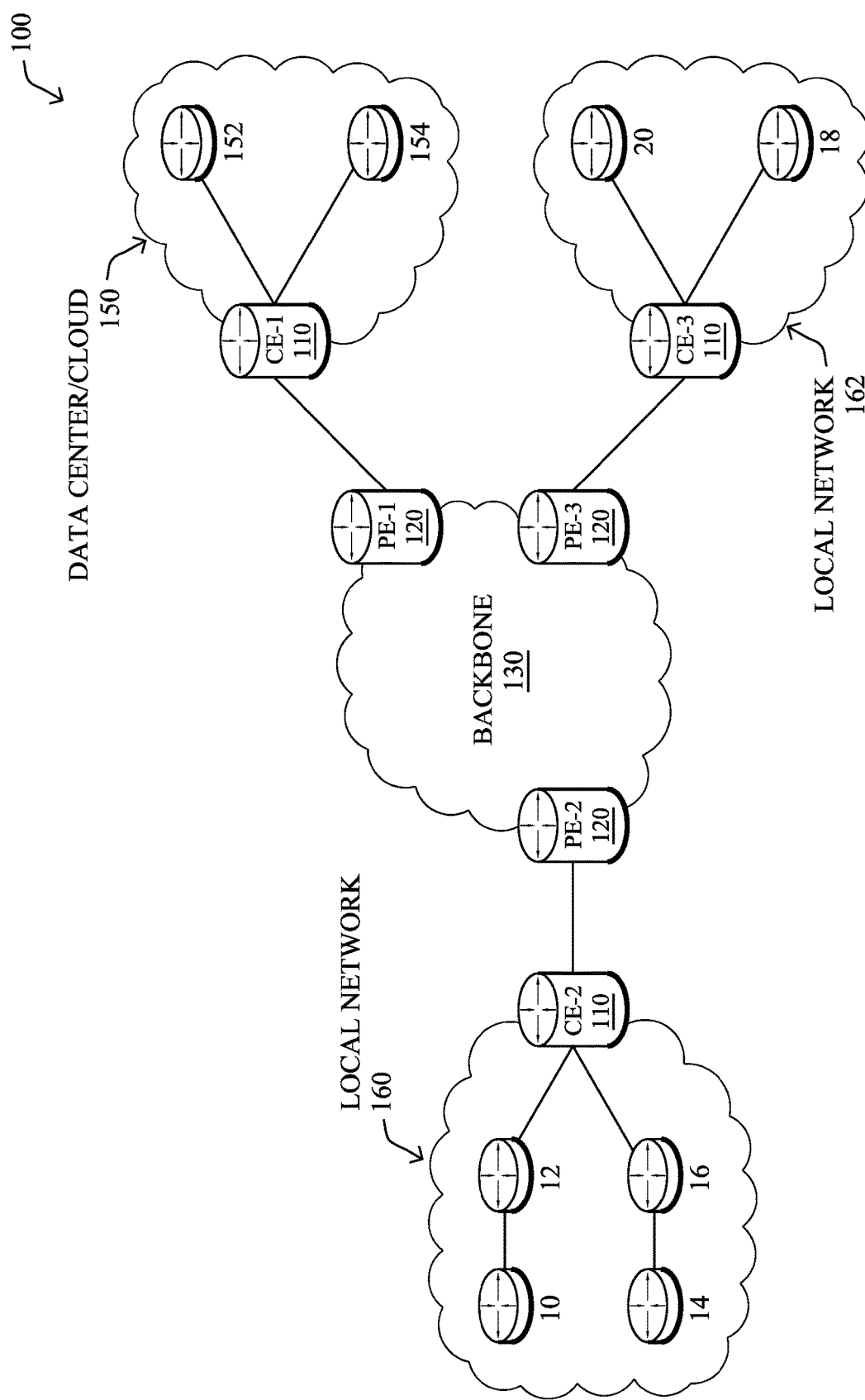

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
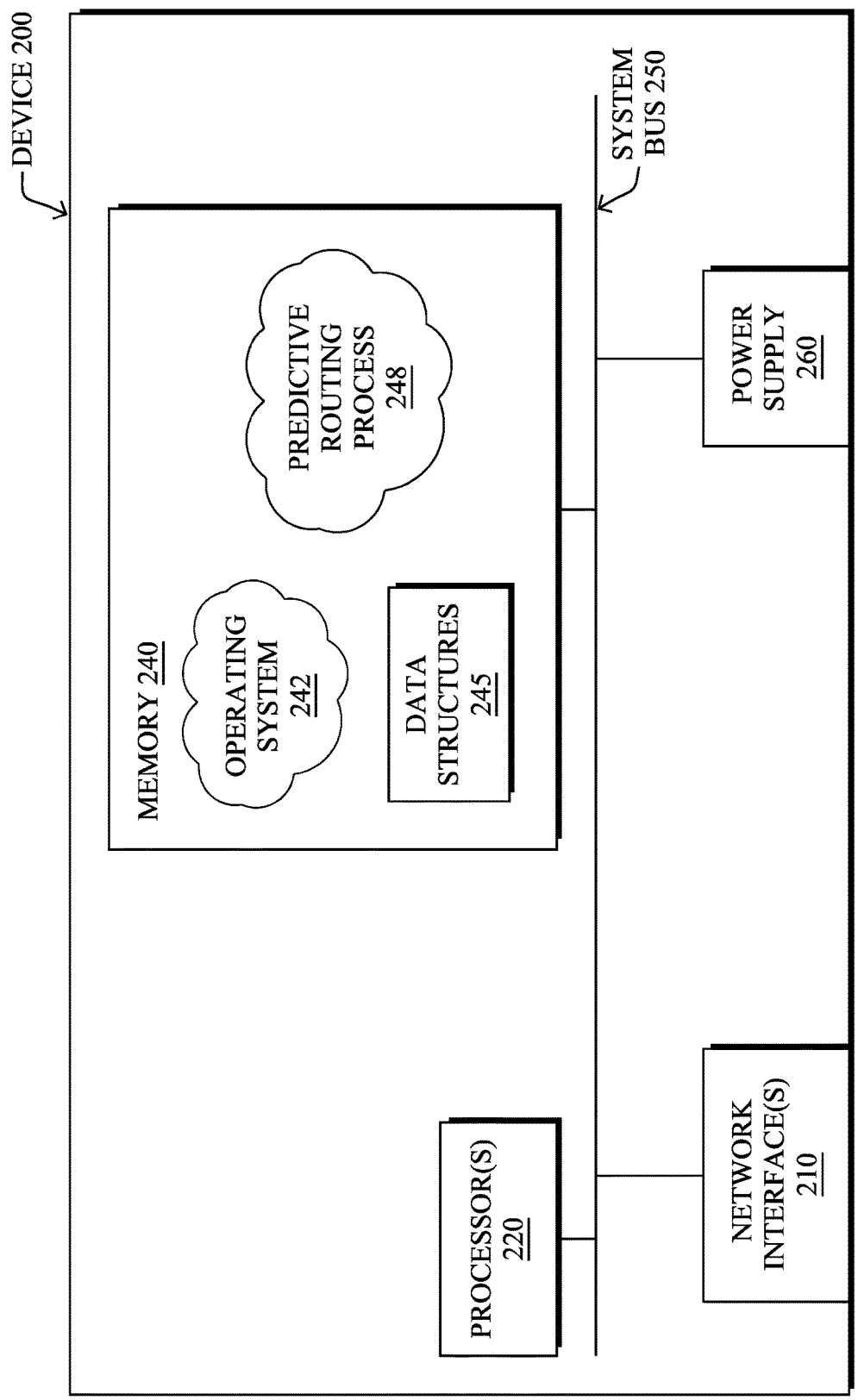
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 248 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, predictive routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may also include computer executable instructions that, when executed by processor(s) 220, cause device 200 to predict failures of network elements in the network (e.g., a link or node/device), thereby allowing device 200 to proactively reroute traffic to avoid the failed element. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of a network element failure, such as failure of a link or node/device, or indicative of normal operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a network element will fail. Conversely, the false negatives of the model may refer to the number of times the model predicted normal network element operations, when the network element actually fails. True negatives and positives may refer to the number of times the model correctly predicted whether a network element will perform normally or will fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, failure detection in a network has traditionally been reactive, meaning that the failure must first be detected before rerouting the traffic along a secondary (backup) path. This is true, not only for IP and MPLS networks, but also for optical networks (with protection and restoration) such as SONET and SDH networks. Typically, failure detection leverages either explicit signaling from the lower network layers (e.g., optical failures signaled to the upper layers) or using a keep-alive mechanism that sends probes at some interval T that must be acknowledged by a receiver (e.g., a tunnel tail-end router). For example, routing protocols such as Open Shortest Path First (OSPF) and Intermediate System to Intermediate System (ISIS) use keep-alive signals over routing adjacencies or MPLS traffic engineering (TE) tunnels. Protocols such as Bidirectional Forwarding Detection (BFD) also make use of keep-alive mechanisms.

Traditionally, failure detection in an SD-WAN has relied on the keep-alive mechanisms of BFD over tunnels, such as IPSec tunnels. When the BFD signaling times out, the tunnel is flagged as failed and traffic is rerouted onto another tunnel. While this approach does help to mitigate the effects of the failure, the reactive nature of this approach also means that at least some of the traffic will be lost.

Figure 3:
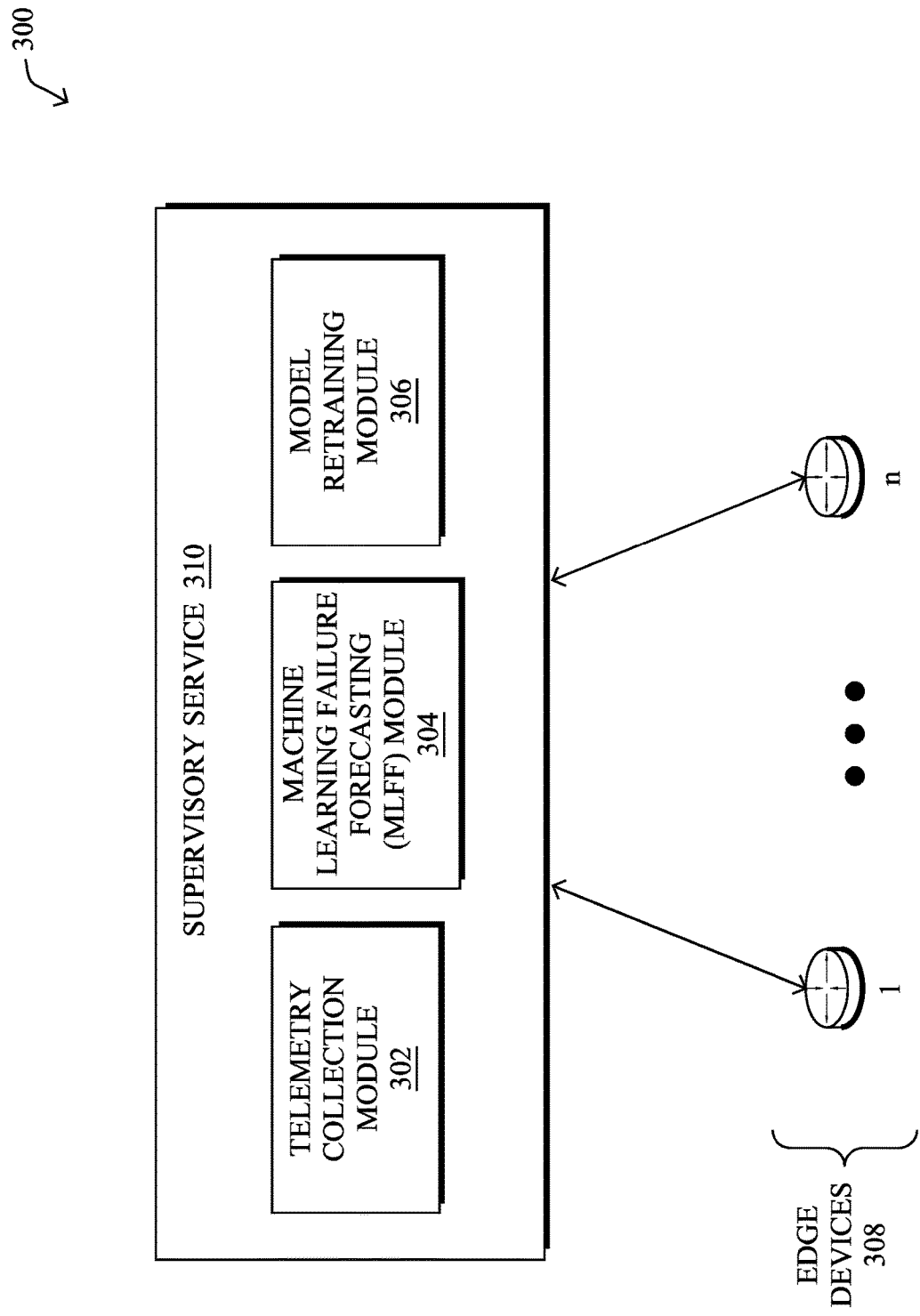
FIG. 3 illustrates an example architecture for predicting failures in a network.

FIG. 3 illustrates an example architecture 300 for predicting failures in network, according to various embodiments. In general, architecture 300 may include a supervisory service 310 located in the cloud or implemented locally in the network under scrutiny, such as a supervisory service for an SD-WAN. As shown, supervisory service 310 may include the following components: a telemetry collection module 302, a machine learning failure forecasting (MLFF) module 304, and/or a model retraining module 306. These components 302-306 may be implemented in a distributed manner or implemented as their own stand-alone services, either as part of the network under observation or as a remote service. In addition, the functionalities of the components of architecture 300 may be combined, omitted, or implemented as part of other processes, as desired.

Supervisory service 310 may be in communication with any number of devices 308 (e.g., a first through $n^{th}$ device), which may be CE routers 110 and/or PE routers 120, described previously, or other forms of networking devices configured to convey traffic through the network. In various embodiments, devices 308 may be part of the same SD-WAN or, in cases in which supervisory service 310 is implemented as a cloud-based service, part of any number of different SD-WANs or other networks.

In general, there are many circumstances in a network that can lead to failures in various areas of the network between a head-end and tail-end router (e.g., between routers 110, etc.). An objective of MLFF 304, as detailed below, is to learn early signs (networking behavioral) that have some predictive power, allowing the model to predict/forecast a tunnel failure or a failure of a network element supporting the tunnel. It is expected that some failures are predictable (i.e., there exist early signs of an upcoming failure) while others will not be non-predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the device 308 involved and may be localized to the core of the service provider network (e.g., the underlying IP, 4G, 5G, etc. network), in which case the failure is non-predicable from the perspective of the device 308.

A first aspect of architecture 300 relates to telemetry collection module 302 obtaining the telemetry data required for model training by MLFF module 304. As used herein, the term 'relevant telemetry' refers to a telemetry measurement variable with predictive power to predict failures, which can be determined dynamically by MLFF module 304. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from devices 308, supervisory service 310 may send a custom request to one or more of devices 308 with the objective of obtaining the list of events of interest along with the set of candidate telemetry variables with potential predictive power to predict failures. In further embodiments, devices 308 may instead provide the telemetry data to supervisory service 310 on a push basis (e.g., without service 310 first requesting the telemetry data).

In various embodiments, telemetry collection module 302 may adjust the set of telemetry variables/parameters obtained from the device(s) 308 and/or their sampling frequency. If, for example, MLFF module 304 determines that a particular telemetry variable has a strong predictive power (according to the feature importance, Shapley values, etc.), the frequency at which such a variable may be gathered may be higher compared to a variable with lower predictive power. MLFF module 304 may also determine the predictive power of a particular telemetry variable by assessing the conditional probabilities involved, in further embodiments.

MLFF module 304 may also select the set of most relevant telemetry variables. In turn, telemetry collection module 302 may request that devices 308 measure and send these variables to supervisory service 310 periodically, since real-time variations of such telemetry is needed for forecasting failure events. For example, based on the above conclusion, MLFF module 304 may determine that the CPU and memory utilizations of one or more networking devices that support a given tunnel should be sent periodically (e.g., every 1 second) by devices 308.

Other telemetry variables, such as during a rekey failure when a device 308 is not able to successfully exchange the security keys with the controller, may also be requested to be sent to supervisory service 310, on occurrence of the event. Since such events are rare and the states of the variables remain the same for longer periods of time, telemetry collection module 302 may request an event-based push request, rather than periodic messages. In other words, telemetry collection module 302 may instruct one or more of devices 308 to report certain telemetry variables only after occurrence of certain events. For example, Table 1 below shows some example telemetry variables and when a device 308 may report them to supervisory service 310:

TABLE 1

| Relevant Telemetry | Request Type |
| --- | --- |
| Memory_utilization | Requested from head and tail edge routers. |
| CPU Utilization | |
| BFD Probe Latency, Loss and Jitter | Periodically once every 1 second. |
| Queue statistics (%-age drops for different queues) | |
| Interface down event | |
| Rekey exchange failure | |
| Router crash logs | Requested from both head and tail |

TABLE 1-continued

| Relevant Telemetry | Request Type |
|---|---|
| | edge routers |
| | Upon event occurrence. |

In a further embodiment, MLFF module 304 may also attempt to optimize the load imposed on the device(s) 308 reporting the telemetry variables to supervisory service 310. For example, MLFF module 304 may determine that the CPU and memory usages should be measured and reported every minute to supervisory service 310.

A key functionality of MLFF module 304 is to train any number of machine learning-based models to predict network element failures. Preferably, the models are timeseries models trained centrally (e.g., in the cloud) using the telemetry collected by telemetry collection module 302. In one instantiation of MLFF module 304, the models may be trained on a per network instance or per-SD-WAN basis. Testing has shown that model performance may be influenced by parameters specific to a given network instantiation, thus promoting an implementation whereby MLFF module 304 trains a model for a specific network deployment. In further embodiments, MLFF module 304 may even train certain models on a per-tunnel basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall >0 is a significant gain. One performance metric that MLFF module 304 may consider is the maximum recall (Max_Recall) achieved by the model given a precision >P_Min. For example, MLFF module 304 may evaluate the variability of Max_Recall across datasets, should a single model be trained across all datasets, to determine whether an SD-WAN specific or even a tunnel specific model should be trained.

In various embodiments, MLFF module 304 may dynamically switch between per-tunnel, per-network/SD-WAN, and global (multiple SD-WAN) approaches to model training. For example, MLFF module 304 may start with the least granular approach (e.g., a global model across all networks/SD-WANs) and then evaluate the performance of the global model versus that of per-customer/SD-WAN models. Such model performance comparison could be easily evaluated by comparing their related precision-recall curves (PRCs)/area under the curve (AUCs), or the relative Max_Recall, given that Precision >P_min.

In some cases, MLFF module 304 may employ a policy to trigger per-customer/SD-WAN specific model training, if the Max_Recall value improvement is greater than a given threshold. In another embodiment, a similar policy approach may be used to specifically require a dedicated model for a given tunnel according to its characteristic (between router A and router B), the type of traffic being carried out (e.g., sensitive traffic of type T, etc.), or the performance of the global or SD-WAN specific model for that tunnel. In such a case, the devices 308 may be in charge of observing the routed traffic and, on detecting a traffic type matching the policy, request specific model training by MLFF module 304, to start per-tunnel model training for that tunnel.

Prototyping of the techniques herein using simple models and input features based on coarse telemetry, such as 1-minute averages of loss, latency, jitter, traffic, as well as CPU/memory of CE routers, lead to recalls in the range of a few percent with a precision of 80% or more. More advanced timeseries models, such as long short-term memories (LSTMs), especially with attention mechanisms, will achieve even better performance. More importantly, using richer and more fine-grained telemetry is an important driver of the forecasting performance.

Once MLFF module 304 has trained a prediction model, different options exist for its inference location (e.g., where the model is executed to predict failures). In a first embodiment, model inference is performed centrally (in the cloud), thus co-located with the model training. In such a case, once MLFF module 304 identifies the set of telemetry variables with predictive power (used for prediction), telemetry collection module 302 may send a custom message to the corresponding device(s) 308 listing the set of variables along with their sampling/reporting frequencies. Note that sampling is a dynamic parameter used by MLFF module 304 computed so as to optimize the PRC of the model against the additional overhead of the device 308 pushing additional data to the cloud (and also generating additional logging of data on the router).

In another embodiment, MLFF module 304 may push the inference task, and the corresponding prediction model, to a specific device 308, so that the prediction is preformed on-premise. Such an approach may be triggered by the frequency of sampling required to achieve the required model performance. For example, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on the router/device 308 are sufficient to feed the local model.

Thus, in some cases, the techniques herein support centralized model training (e.g., in the cloud), combined with the ability to perform local (on-premise) inference based on the required sampling frequency, local resources available on the device 308, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, MLFF module 304 may take this constraint into account by evaluating the volume of required telemetry, according to the sampling frequency, and the WAN bandwidth allocated on the network for the telemetry traffic. To that end, MLFF module 304 may analyze the topology of the network and the available bandwidth for telemetry reporting, e.g., according to the quality of service (QoS) policy. If the bandwidth available for the telemetry used for the inference of the model exceeds the capacity, MLFF module 304 may decide to activate a local inference by pushing a prediction model to one or more of devices 308.

In yet another embodiment, MLFF module 304 may take a mixed approach whereby some of devices 308 perform the inferences locally, while others rely on supervisory service 310 to perform the predictions.

A further embodiment of the techniques herein introduces a feedback mechanism whereby feedback regarding the predictions by a trained model is provided to model retraining module 306. In cases in which the model is executed on device 308, the device 308 may report the rate of false positives and/or false negatives to model retraining module 308. Optionally, the reporting can also include additional context information about each false positive and/or false negative, such as the values of the telemetry variables that led to the incorrect prediction. If the performance of the model is below a designated threshold, model retraining module 306 may trigger MLFF module 304 to retrain the model, potentially increasing the granularity of the model, as well (e.g., by training a tunnel-specific model, etc.). In cases in which MLFF module 304 trains multiple prediction models, model retraining module 306 may evaluate the performance of each model and, based on their performances, decide that a particular one of the models should be used. Such an approach allows MLFF module 304 to dynamically switch between models, based on the data pattern currently being observed.

When failures are predicted in the cloud by supervisory service 310, model retraining module 306 may similarly receive feedback from devices 308 regarding the predictions. For example, once a model M predicts the failure of a tunnel at a given time, MLFF module 304 may send a notification to the affected device 308 indicating the (list of) tunnel(s) for which a failure is predicted, along with the predicted time for the failure, and other parameters such as the failure probability Pr (which can be a simple flag, a categorical variable (low, medium, high) or a real number). The device 308 may use Pr to determine the appropriate action, such as pro-actively rerouting the traffic that would be affected by the failure onto a backup tunnel. In one embodiment, the predicted failure may be signaled to the device 308 using a unicast message for one or more tunnels, or a multicast messages signaling a list of predicted failure to a set of devices 308.

Regardless of how model retraining module 306 receives its feedback, either from the device 308 executing the prediction model or from MLFF module 304 executing the model, model retraining module 306 may dynamically trigger MLFF module 304 to retrain a given model. In one embodiment, the model re-training may be systematic. In another embodiment, upon reaching a plateau in terms of improvement for Max_Recall or Max_Precision, model retraining module 306 may reduce the frequency of the model training.

Figure 4C:
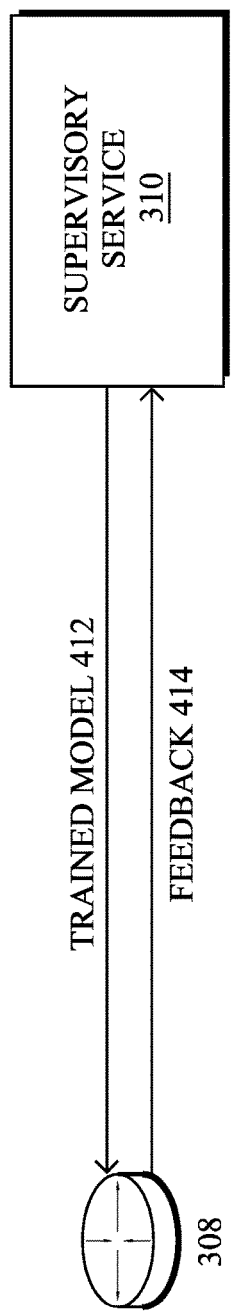

FIGS. 4A-4C illustrate examples of feedback for failure predictions, in various embodiments. As shown in example implementation 400 in FIGS. 4A-4B, assume that the trained model is executed in the cloud by supervisory service. In such a case, supervisory service 310 may send a sampling request 402 to a device 308 that indicates the telemetry variables to sample and report, as well as the determined sampling/reporting period(s) for those variables. In turn, device 308 may report the requested telemetry 404 to supervisory service 310 for analysis. For example, supervisory service 310 may request that device 308 report is CPU load every minute to supervisory service 310, to predict whether the tunnel associated with device 308 is predicted to fail. More specifically, supervisory service 310 may use telemetry 404 as input to its trained prediction model, to determine whether telemetry 404 is indicative of a failure that will occur in the future.

When supervisory service 310 determines that a failure of a network element is predicted, it may send a predicted failure notification 406 to device 308 that identifies the element predicted to fail, the time at which the failure is expected to occur, and potentially the probability of failure, as well. Depending on the timing and probability of failure, device 308 may opt to reroute the affected traffic, or a portion thereof. In turn, device 308 may monitor the element predicted to fail and provide feedback 408 to supervisory service 310 indicating whether the element actually failed and, if so, when.

Supervisory service 310 can then use feedback 408 to determine whether model retraining should be initiated, such as by training a more granular model for the SD-WAN instance or the specific tunnel or path under scrutiny.

FIG. 4C illustrates an alternate implementation 410 in which supervisory service 310 pushes the failure prediction model to device 308 for local/on-premise inference. For example, supervisory service 310 may opt for device 308 to perform the local inferences, such as when model 412 requires too much bandwidth to send the needed telemetry to supervisory service 310 for cloud-based prediction. In turn, device 308 may use the corresponding telemetry measurements as input to trained model 412 and, if a failure is predicted, perform a corrective measure such as proactively rerouting the traffic to one or more other tunnels or other paths. In addition, device 308 may provide feedback 414 to supervisory service 310 that indicates false positives and/or false negatives by the model. For example, if device 308 reroutes traffic away from a element predicted by model 412 to fail, and the tunnel does not actually fail, device 308 may inform supervisory service 310. Supervisory service 310 may use feedback 414 to determine whether model 412 requires retraining, such as by adjusting which telemetry variables are used as input to the model, adjusting the granularity of the training (e.g., by using only training telemetry data from the tunnel, etc.), or the like.

As noted above, machine learning now makes predictive routing possible in SD-WANs and other networks by predicting path or tunnel failures before they actually occur. However, simply predicting that a given link/tunnel is going to fail and rerouting traffic away from that tunnel does not guarantee acceptable performance. Indeed, where to reroute the packets, as well as predicting the full failure patterns of the tunnel, are also equally important. For example, a link/tunnel may exhibit 'flapping' in which it oscillates between down and up states. In existing, reactive approaches today, such as MPLS Traffic Engineering (MPLS-TE) Fast Reroute, a non-revertive approach is often taken that requires a specific action to be triggered (e.g., a global re-optimization) before the traffic can be moved back to its original link/tunnel. Doing so assumes that the alternate tunnel will provide better performance than the original tunnel, which is not always the case.

Consider the situation in which the primary tunnel and the alternate tunnel both exhibit flapping. If the primary tunnel is predicted to fail and its traffic rerouted onto the alternate tunnel, which is equally flappy, the quality of service (QoS) of the application(s) will be severely affected. One observation is that all links/tunnels connected to an edge router may go down in an SD-WAN. For instance, this can be attributable to the control connection between the router and the central controllers being lost, transiently. In such case, there is no point in rerouting onto another tunnel on the same edge router, as doing so will only result in another connection failure. Hence, the proactive rerouting mechanism has to have a holistic knowledge of both performance of links (e.g., loss, latency, jitter, etc.) and the flapping behavior of all suitable links, before initiating a reroute.

Using a Flappiness Metric to Limit Traffic Disruption in Wide Area Networks

The techniques herein introduce systems and methods to proactively reroute traffic from a tunnel predicted to fail onto one or more alternate tunnels, based on a flappiness metric. In some aspects, the techniques herein use machine learning to learn and quantify the flappiness of a particular link/tunnel. The learning may rely on telemetry data such as the time between failures, the overall time spent in a failure state, and the like. In further aspects, the techniques herein also leverage machine learning to control where and how any rerouting should be performed, based on the link flappiness metrics of the current link and/or the alternate links. This information can then be fused with performance information for the links (e.g., loss, latency, jitter, SLA requirements, etc.), to predict the probability of link failures and link performance. In another aspect, the techniques herein also allow different applications to be rerouted onto different possible links, based on the expected application QoS on the alternate link(s). In yet another aspect, highly flappy links can be blacklisted from rerouting decisions, to avoid QoS degradation, which can occur if a link flaps too often.

Specifically, according to one or more embodiments herein, a device in a network obtains tunnel flappiness metrics associated with a particular tunnel in the network exhibiting flapping. The device makes, based on the tunnel flappiness metrics, a prediction that the particular tunnel is going to flap. The prediction is made using a machine learning model. The device proactively reroutes, based on the prediction, traffic from the particular tunnel onto an alternate tunnel, prior to the particular tunnel flapping. The device evaluates performance of the alternate tunnel, after proactively rerouting the traffic from the particular tunnel onto the alternate tunnel.

Illustratively, the techniques described herein may be performed by hardware, software, and/or firmware, such as in accordance with the predictive routing process 248, which may include computer executable instructions executed by the processor 220 (or independent processor of interfaces 210) to perform functions relating to the techniques described herein.

Figure 5:
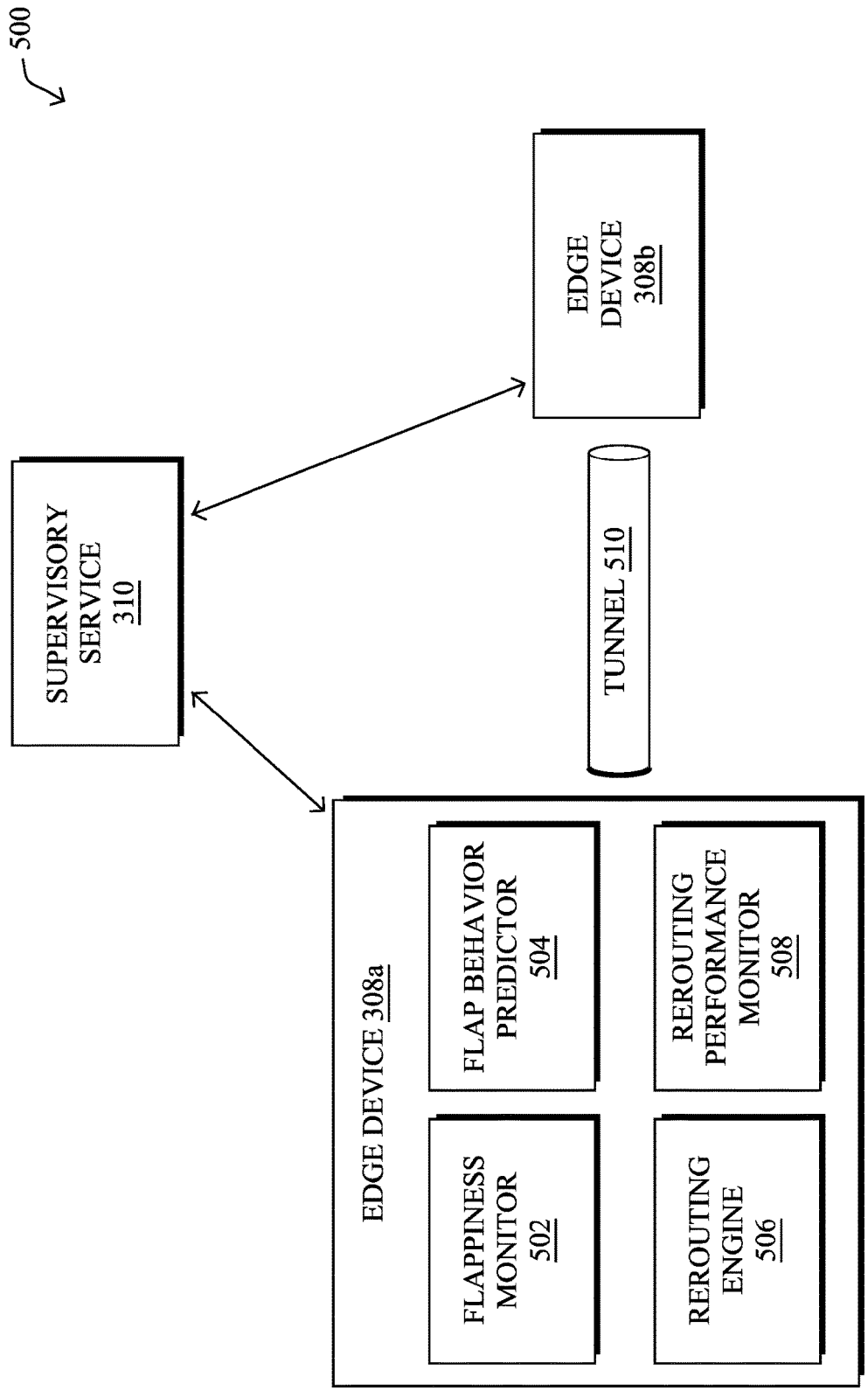
FIG. 5 illustrates an example architecture for using a flappiness metric to limit traffic disruption in wide area networks (WANs)

Operationally, FIG. 5 illustrates an example architecture 500 for using a flappiness metric to limit traffic disruption in WANs, according to various embodiments.

Continuing the example of FIG. 3, architecture 500 may include any or all of the components of architecture 300 with the following additions: a flappiness monitor 502, a flap behavior predictor 504, a rerouting engine 506, and/or a rerouting performance monitor 508. As would be appreciated, the various components shown may be combined or omitted, as desired. Further, these components can be executed either locally on a particular device or implemented in a distributed manner, in various cases. In the distributed case, the set of executing devices can also be viewed as a single device, for purposes of implementing architecture 500.

In various embodiments, flappiness monitor 502 may be instantiated on a networking device, such as edge device 308a, and measures different metrics required for proactive rerouting. For instance, assume that there is a tunnel 510 formed over a WAN between edge device 308a and edge device 308b. During operation, flappiness monitor 502 may measure, at every flap of tunnel 510, the amount of time that tunnel 510 stays down (flapDuration), the time that elapsed from its previous flap (timeForNextFlap or timeFromPrevi-ousFlap), or other timing information regarding flapping events involving tunnel 510. In addition, flappiness monitor 502 may measure the context information that is required to predict the flapping behavior of tunnel 510. For example, flappiness monitor 502 may also measure the traffic load of edge device 308a, its CPU utilization, its memory utilization, or the like. In further embodiments, flappiness monitor 502 may collect the recent device events of edge device 308a, such as the number of control connection failure messages or system configuration change events. The events are stored locally and may be sent periodically (or asynchronously) to supervisory service 310 using an IPv6 message comprised of various type-length-values (TLVs) specifying the above attributes.

More specifically, a number of observations have been made about the flapping behaviors across a variety of live SD-WAN networks. During testing a total of 439,000 tunnels were assessed for flapping behavior over a one-month period in a WAN comprising 1,100 edge routers. From this, it was observed that 99% of the tunnels, approximately 435,000 of the tunnels, had less than 192 flaps during this time. Conversely, approximately 4,000 of the tunnels were observed to be highly flappy, with values ranging up to 13,583 flaps during the month.

Figure 6:
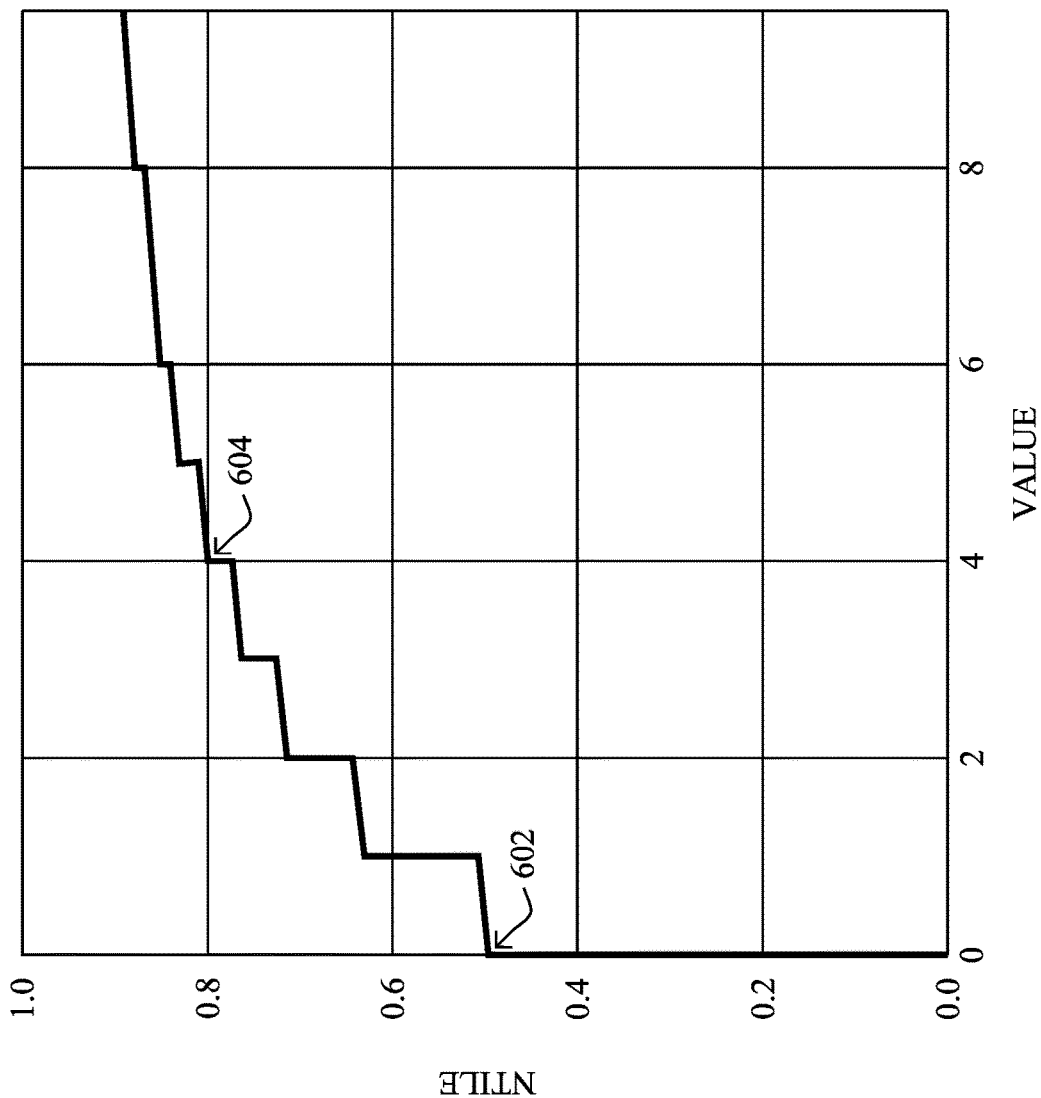
FIG. 6 illustrates an example plot of tunnel failures observed in live networks.

FIG. 6 illustrates a plot 600 of the cumulative distribution function (CDF) of the number of flaps observed per tunnel during the one-month period. The x-axis of plot 600 indicates the number of flaps observed for one tunnel and the y-axis of plot 600 indicates the faction of tunnels which have flaps less than or equal to a given value of x (e.g., the CDF). At point 602 in plot 600, it can be seen that 50% of the tunnels, approximately 220.000 of the total set, exhibited no flaps whatsoever during the month. At point 604, it can also be seen that 80% of the tunnels, approximately 352,000 of them had less than four flaps over the one-month period. However, the final 1% of the tunnels exhibited flapping ranging 192 flaps during the month up to 13,583 flaps. From this, it can be seen that the tunnels in a WAN may exhibit widely varying flapping behaviors.

There are many reasons why flappiness can vary dramatically across a network and is due to the underlying cause of the failure. For instance, a fiber cut does not lead to a high degree of flappiness, whereas a link failure due to a higher number of error is more likely to lead to flappiness.

Figure 7A:
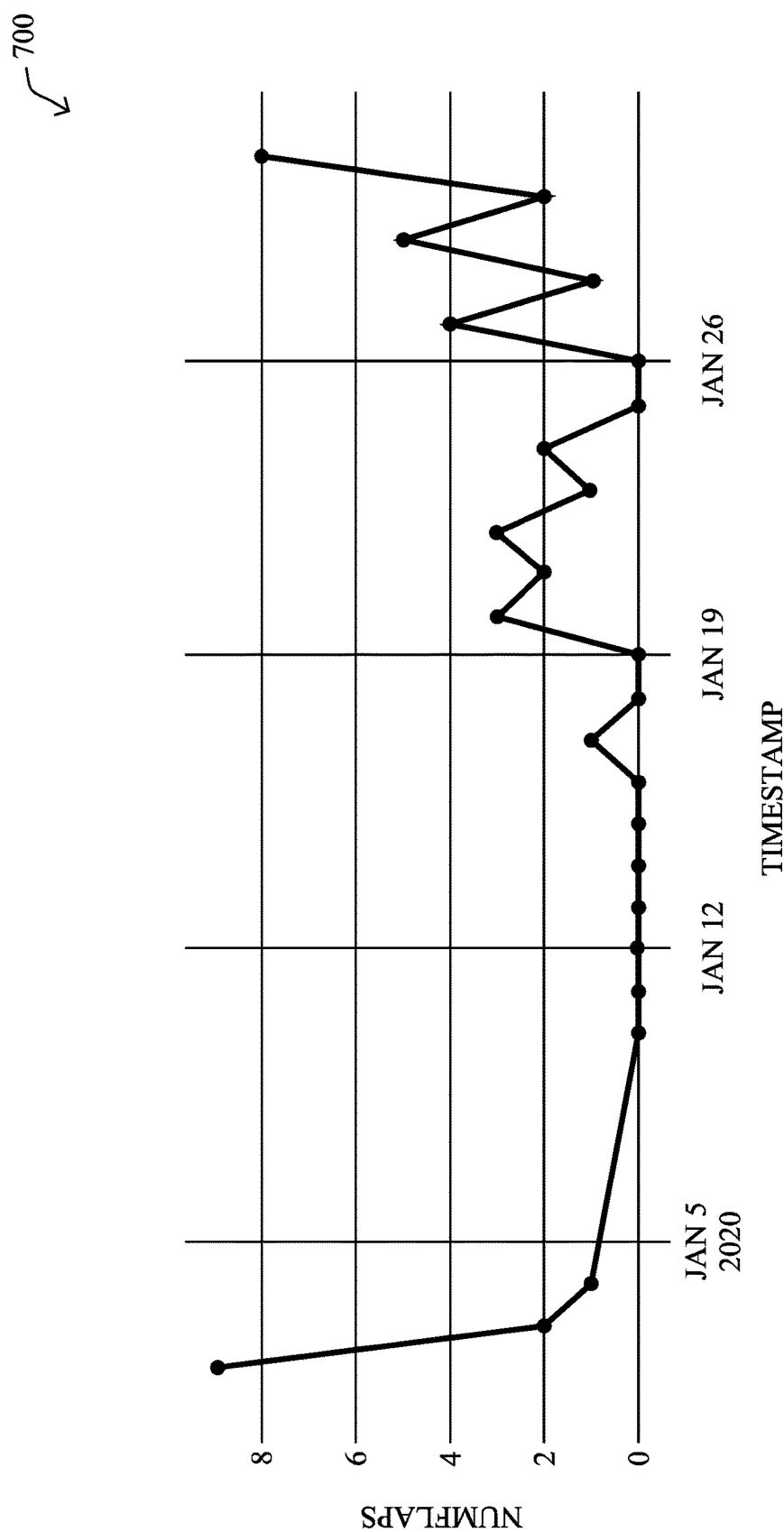
FIGS. 7A-7D illustrate example plots of flappiness metrics observed in live networks.

FIG. 7A illustrates a plot 700 of the number of flaps per day for a single tunnel that was observed in the live network. From plot 700, it can be seen that the number of flaps per day is not constant, meaning that flapping behaviors can also vary with time.

This may be due to any number of reasons, some of which can be learned over time. Hence, measuring the variations of flappiness with respect to time may also be important to predict whether the link is suitable for rerouting.

Figure 7B:
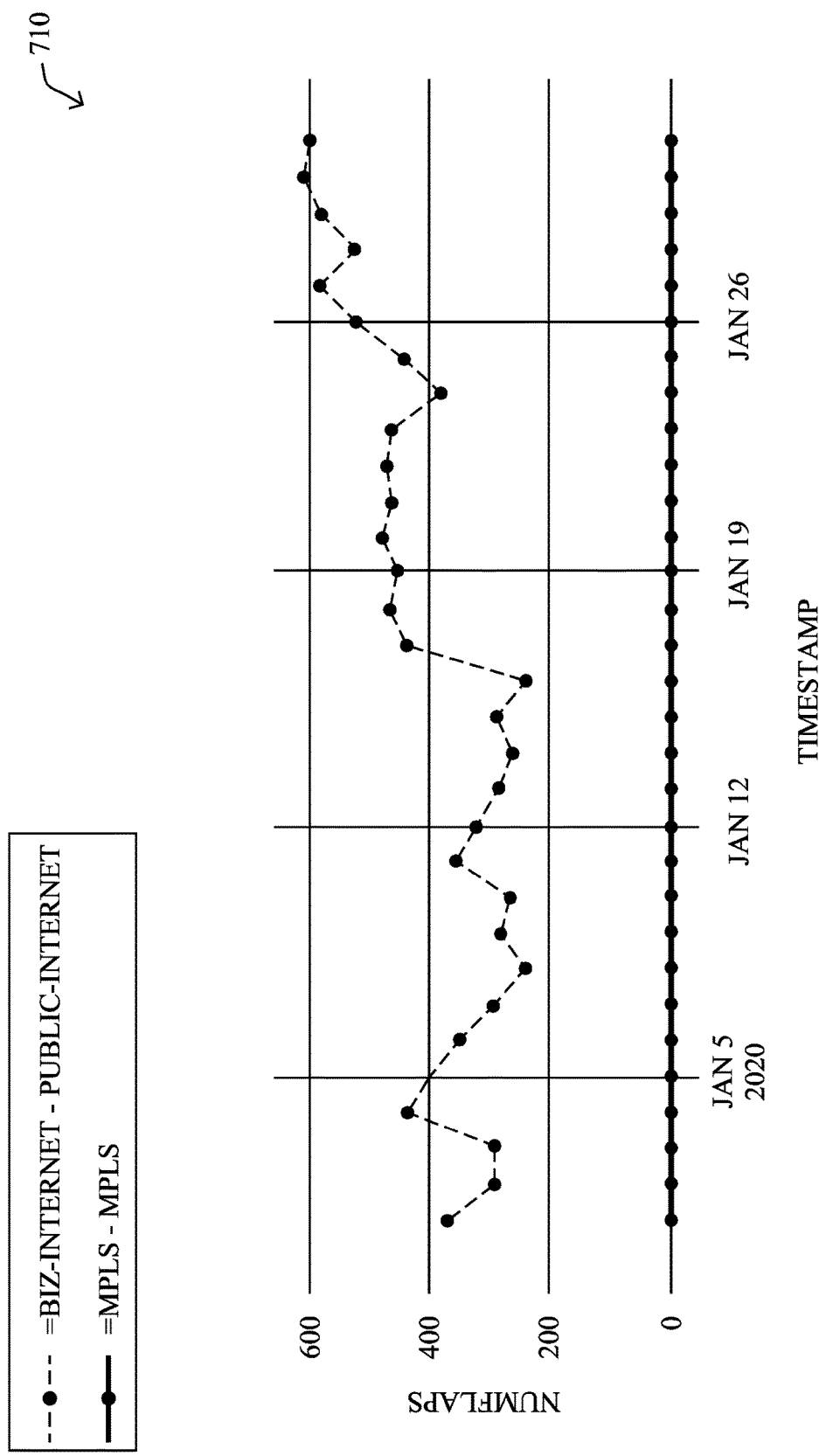

FIG. 7B illustrates a plot 710 showing the number of daily flaps exhibited by three different tunnels between a pair of edge routers. Any of the three tunnels can be used to route packets between the edge routers, although the cost of MPLS tunnels may be comparatively expensive to use. From plot 710, it can be seen that the MPLS link, denoted "mpls-mpls" is stable and exhibits zero flaps per day. However, one of the Internet-based links, "biz-internet—public-internet" exhibits a very high number of flaps. This shows that, in stable cases, there are good alternative tunnels (e.g., mpls-mpls) that can be used to reroute traffic when the unstable tunnel is predicted to fail.

Figure 7C:
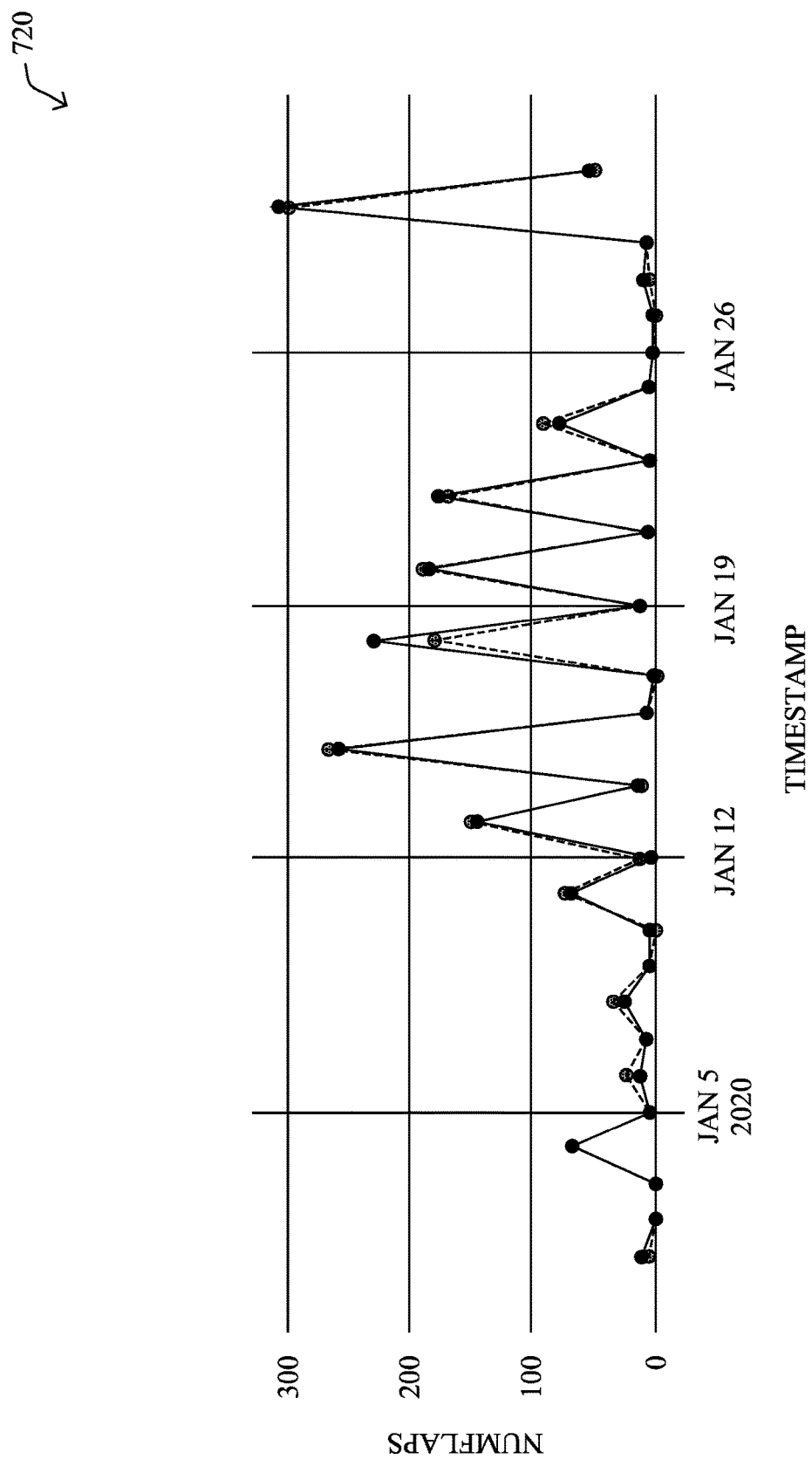

However, the opposite phenomenon might also occur in which there are no possible alternative tunnels during certain periods of time. For instance, FIG. 7C illustrates a plot 720 of the number of flaps exhibited per day by two different tunnels between the same pair of edge routers. As can be seen, the two tunnels exhibit very similar flapping behaviors. This means that when one tunnel fails, the other tunnel cannot be used to reroute its traffic, since it could also fail.

Figure 7D:
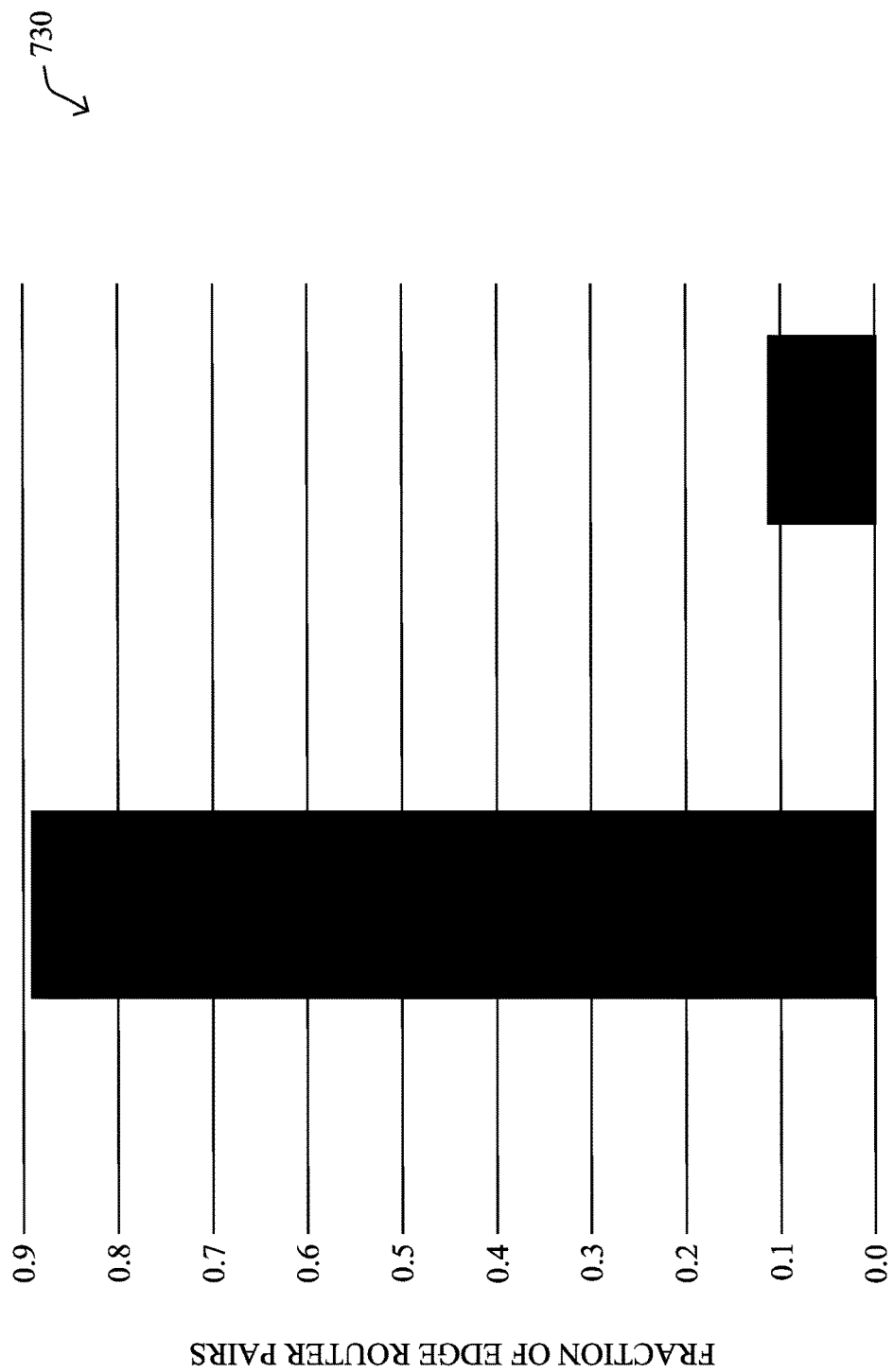

FIG. 7D illustrates a plot 730 of the fraction of edge router pairs and number of flaps, based on the networks observed during testing of the techniques herein. For a given pair of edge routers, there may be multiple tunnels between them. From plot 730, it can be seen that only a small percentage of edge router pairs are associated with the flapping tunnels. Indeed, approximately 90% of the edge router pairs have zero flaps. Hence, rerouting (in case an occasional flap occurs on such edge-router pair) should be straight-forward and the traffic can be switched to an alternative tunnel. However, it is challenging to reroute traffic involving the other 10% of the edge router pairs. Referring again to FIG. 5, another component of architecture 500 is flap behavior predictor 504. This component uses machine learning to predict the flapping behavior of a particular tunnel, such as tunnel 510. In one embodiment, flap behavior predictor 504 may build the features from recent and long-time history of flapiness metrics and other contextual metrics that were captured by flappiness monitor 502. For example, flap behavior predictor 504 may model the flapping behavior of tunnel 510 using any or all of the following features collected by flappiness monitor 502:

Tunnel Flappiness Features: These measure the short and long term flapiness of the link/tunnel. For instance, such features may include numFlapsInLast1 Minute, numFlapsInLast5 Minutes, medianTimeForNextFlapinLast1Min, medianTimeForNextFlapInLast5Mins, medianFlapDurationInLast1 Minute, medianFlapDurationInLast5 Minutes, featuresmedianFlapsPerDayInLast7Days, etc.

Edge Router Flapiness Features: The above features can be extended to measure flapiness behavior at the pair of edge-routers, such as edge devices 308*a*-308*b*. This is useful to detect when all tunnels are flapping on the edge-router pair (e.g., tunnel 510 is exhibiting flapping, along with any other tunnels between edge devices 308*a*-308*b*).

Tunnel Health Metrics: For instance, the latency, loss, jitter, etc. on the tunnel, such as in the past n-number of seconds.

Traffic Features: Flappiness may also be a function of the amount of traffic on the tunnel. Indeed, some tunnels may flap when conveying a high amount of traffic, but not with a low amount of traffic. This information can be used to decide whether an alternate tunnel onto which the traffic on another tunnel may be routed is also likely to exhibit flapping due to the additional traffic introduced. Example features under this category may include: medianBytesPer10MinsDuringFlaps, 95thPercentileBytesPer10MinsDuringFlaps, medianThroughputDuringFlaps, 95thPercentileThroughputDuringFlaps, etc.

Router Telemetry Features: Router telemetry regarding the resource usage of the device, such as edge router 308*a*, such as its CPU usage history, its memory usage history, etc.

Note that flap behavior predictor 504 may also use a time series of features to make its predictions. To this end, in some embodiments, flap behavior predictor 504 may leverage a multiple regression model that uses the above features to predict:

Flapping Probability: One regressor of the model may predict the probability of a given tunnel exhibiting flapping within the next n-number of seconds, based on the above features.

Flappiness Downtime Prediction: Another regressor of the model may predict the amount of time that the tunnel will be down during the flap. This is useful for some applications. For example, a fairly long downtime (e.g., on the order of minutes) may be acceptable for email applications, whereas a downtime of even tens of milliseconds can be harmful for voice application data.

Along with the main regression metrics, the model of flap behavior predictor 504 may also provide the uncertainty values (e.g., using generative models) so that rerouting engine 506 can use this information when evaluating alternative paths for a reroute.

In various embodiments, the model of flap behavior predictor 504 may be trained by supervisory service 310 (e.g., by providing the flappiness metrics to supervisory service 310 for training). Other edge devices, such as edge device 308*b* may also do so. This allows supervisory service 310 to perform the training and push the resulting models back to the edge devices 308. Note that such models may be specific to a given service provider (SP), a specific tunnel (e.g., tunnel 510), or may be more generic in nature. In other embodiments, training may be performed directly on an edge device 308. However, model training tends to be a very resource-intensive process that may be better suited for performance in the cloud.

With respect to selecting an alternate tunnel on which to reroute traffic, a number of observations were made from live networks. For instance. FIGS. 8A-8E illustrate example graphs of tunnel metrics observed in various live networks.

Figure 8A:
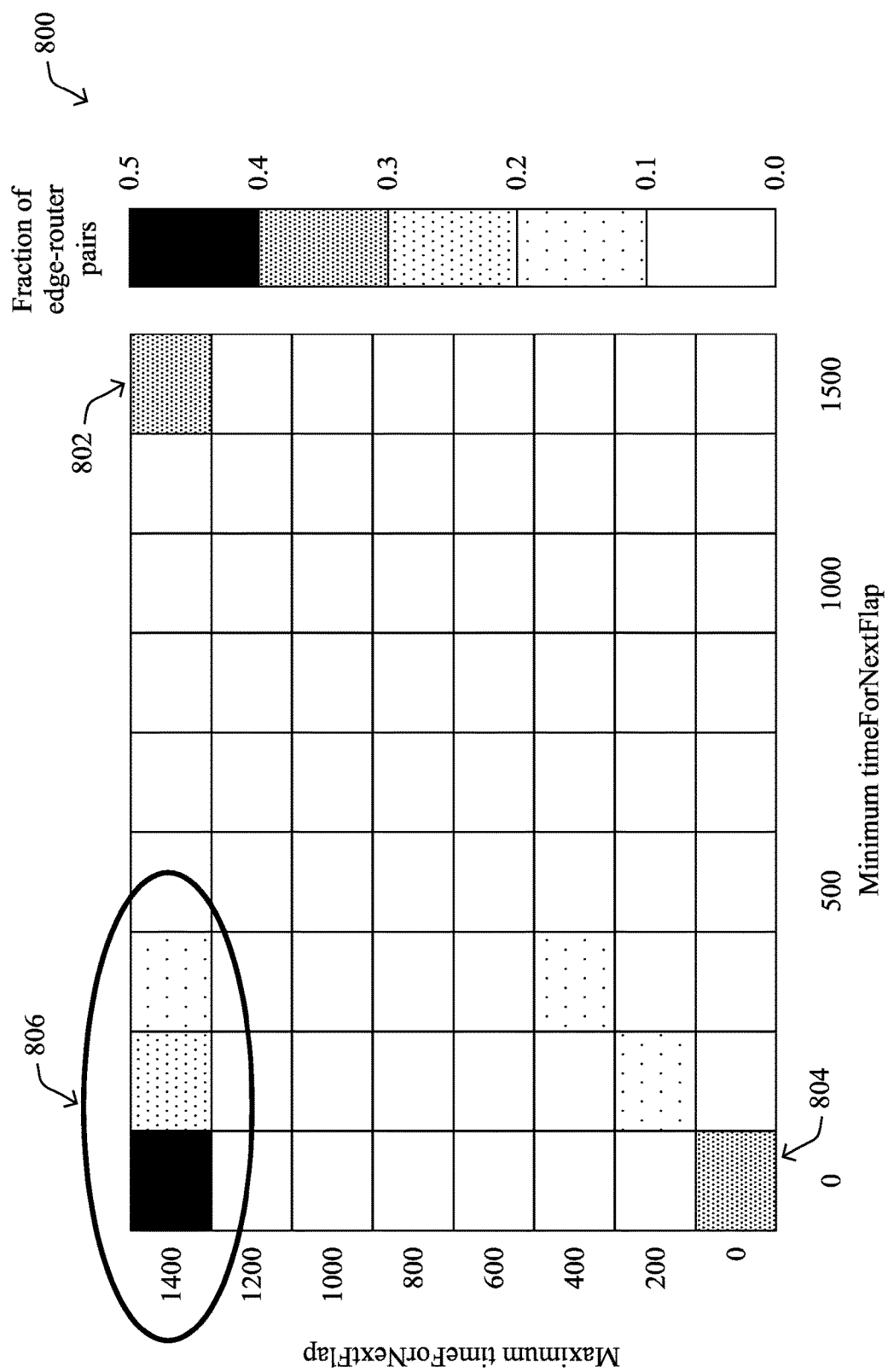
FIGS. 8A-8E illustrate example graphs of tunnel metrics observed in live networks.
Figure 8B:
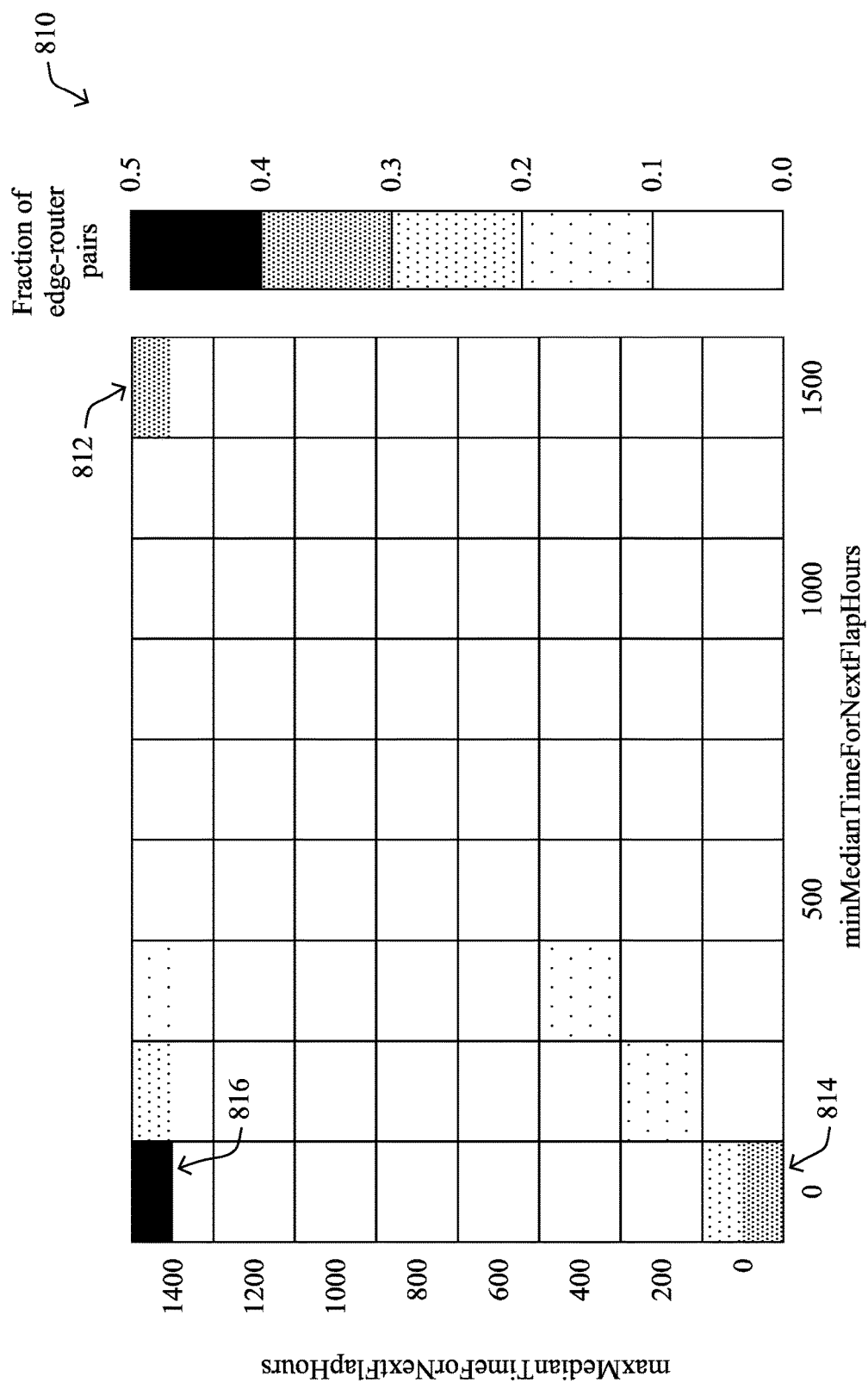
Figure 8C:
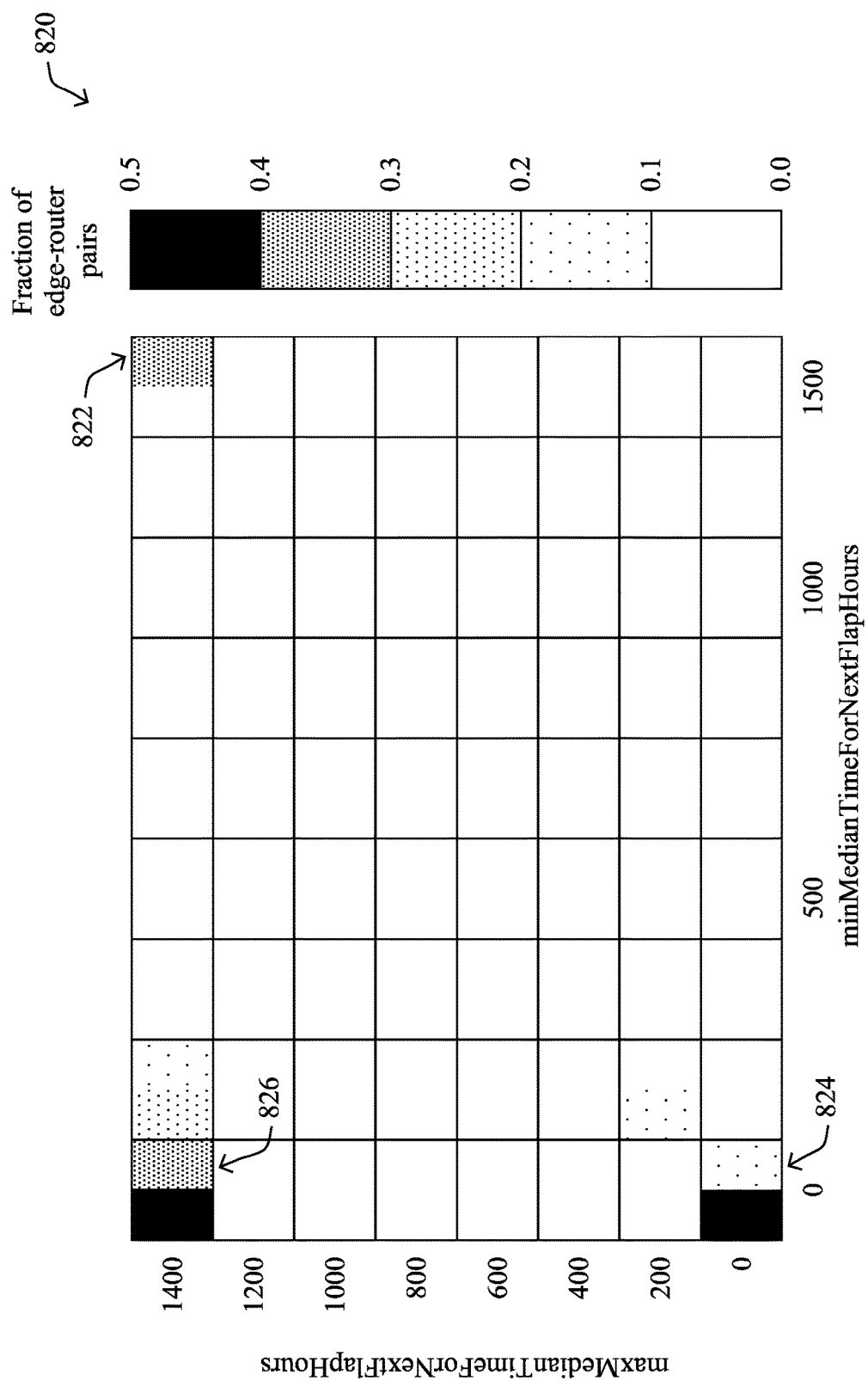
Figure 8D:
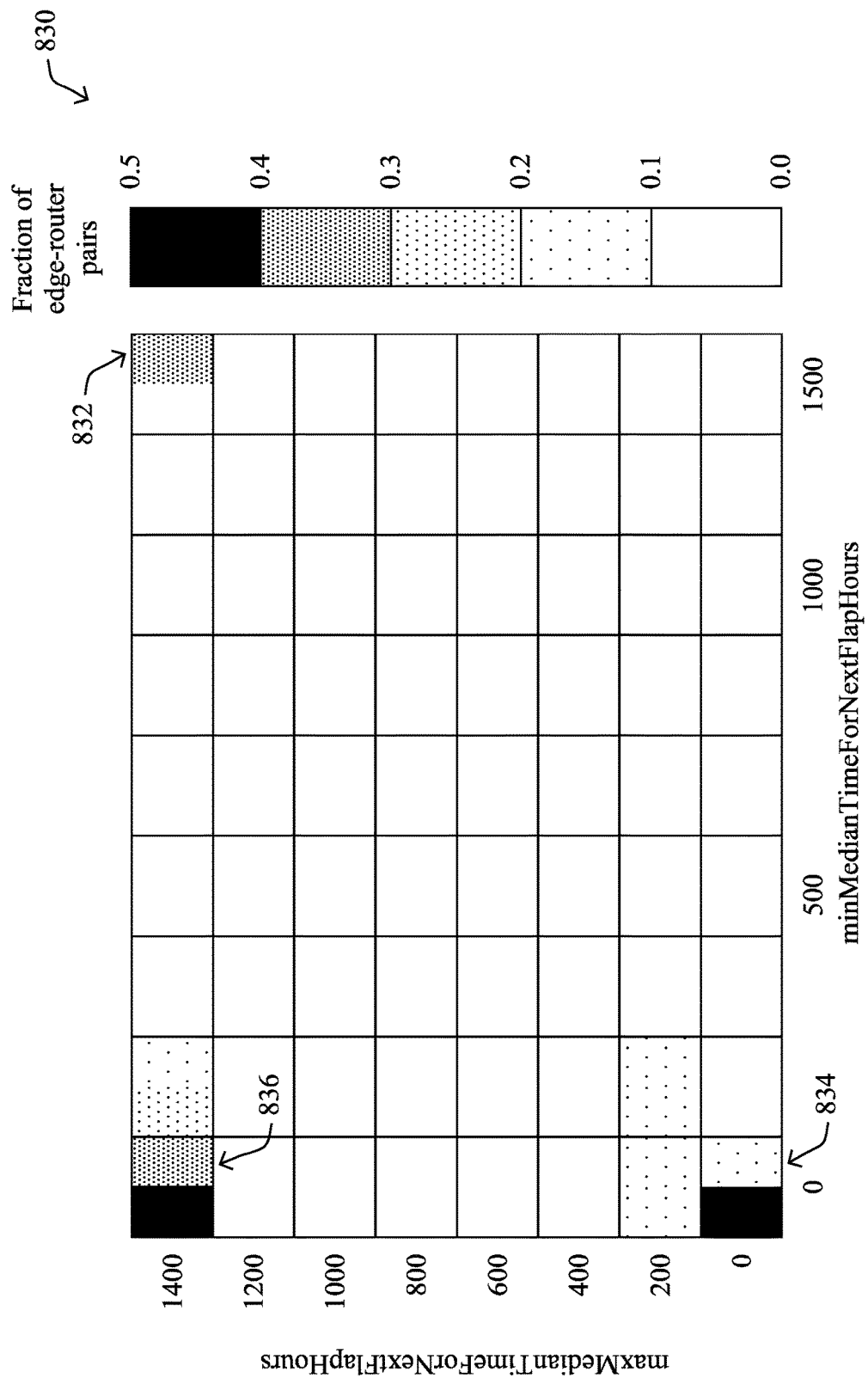
Figure 8E:
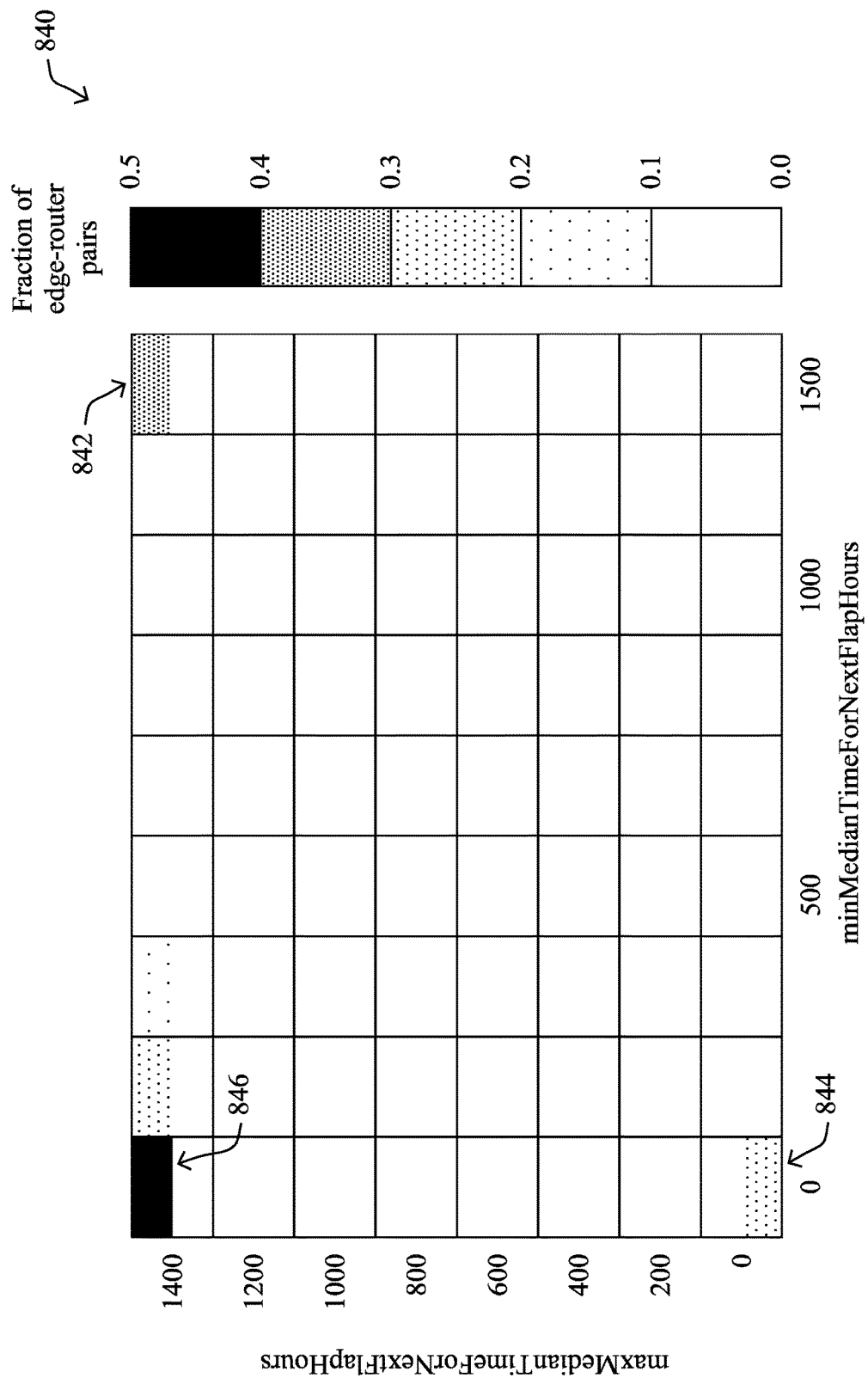

FIG. 8A shows a heatmap 800 cross-referencing the maximum and minimum times until the next flap between endpoint router pair as a function of the fraction of edge router pairs. This heatmap provides an intuition on how timeForNextFlap can be used to decide rerouting decisions and only considers edge router pairs which have some non-zero flaps on some tunnels. Three prominent regions can be observed:

The first region 802 shows where all tunnels on the edge-router pairs have large timeForNextFlap. In such cases (around 10% of the edge-router pairs), flaps occur occasionally, and an alternative tunnel may be chosen for rerouting.

The second region 804 shows edge router pairs where none of the tunnels have stable behavior. In around 20% of the edge router pairs, all tunnels have very low timeForNextFlap, which indicates that rerouting is tricky, and the alternative route might usually result in failures, too.

The third region 806 shows where there is at least one tunnel with high timeForNextFlap and there are unstable tunnels (with low timeForNextFlap). When the unstable tunnel fails (which flaps often), there is usually a stable tunnel which can be used for rerouting.

Similar patterns were also observed across different networks, as shown in heatmaps 810-840 in FIGS. 8B-8E, respectively. Indeed, regions 812, 822, 832, and 842 all exhibit large timeForNextFlap metrics. Similarly, regions 814, 824, 834, and 844 all correspond to edge router pairs where none of the tunnels exhibit stable behaviors. Finally, regions 816, 826, 836, 846 each indicate where there is at least one tunnel with a high timeForNextFlap This indicates that such behaviors are more global in nature and can be learned.

Referring yet again to FIG. 5, another component of architecture 500 is rerouting engine 506. Typically, rerouting engine 506 is resident on the networking device, such as edge device 308a. However, other embodiments, provide for rerouting engine 506 to be executed by supervisory service 310 in conjunction with flap behavior predictor 504, and rerouting instructions pushed down to the corresponding edge devices 308.

During execution, rerouting engine 506 is triggered when a prediction is made that a given tunnel is going to fail (henceforth referred to as the "primary tunnel"). In turn, rerouting engine 506 component is responsible for monitoring all applications that are on the primary tunnels, such as tunnel 510, selecting the set of alternative tunnel(s) for the traffic, and decide which is the "best" alternative tunnel(s) onto which the traffic should be rerouted, if at all. Rerouting engine 506 may also reroute different applications on the primary tunnel onto different alternative tunnels based on the expected application QoS. For example, rerouting engine 506 may consider the sensitivity of that application to packet drops, to determine where the traffic should be rerouted (e.g., if the application is very sensitive to packet drops, such as voice traffic, then rerouting engine 506 may select the tunnel with the best flappiness metric.

In various embodiments, rerouting engine 506 will select the best possible alternate tunnel in any or all of the following phases:

Identify feasible alternative tunnels: Rerouting engine 506 shortlists all possible alternate tunnels between the pair of edge routers. Any of these tunnels can be used to transfer the packets currently on the primary tunnel. In some cases, this identification can also take into account cost models. For instance, if sending data over MPLS is considered expensive and in violation of this cost model, rerouting engine 506 may remove the MPLS tunnel from the set of eligible alternate tunnels.

Inspect Applications: Rerouting engine 506 will then inspect all of the applications and their throughputs that are currently scheduled on the primary tunnel. To do so, rerouting engine 506 may obtain this information from Netflow, deep packet inspection (DPI) engines, or the like.

Predict Fappiness: Rerouting engine 506 may then call flap behavior predictor 504 for each feasible alternate tunnel. To build the features, flap behavior predictor 504 may consider the effects of adding the current traffic on the primary tunnel to the traffic on the alternate tunnel. Such traffic features, along with other alternative tunnel features, is then used by flap behavior predictor 504 to predict the flap probability and flap downtime.

Application Matching: For all of the applications conveying traffic via the primary tunnel, the expected flap probability and downtime can be used by rerouting engine 506 to check whether the application QoS would be satisfied if sent via the alternate tunnel. In one instantiation, this can be done by first having a mapping between a given application and acceptable levels of downtimes. In another instantiation, this can be learned by measuring the application downtime (e.g., TCP RTT delays observed or number of codec changes on a video, etc.). Path metrics such as loss, latency, jitter, etc. on the alternate tunnel can also be used to see whether the alternative tunnel is a right fit. For example, traffic for a voice application may be rerouted only if the loss <0.5%, latency <100 ms, and jitter <50 ms on the alternate tunnel.

Rerouting Traffic: Once rerouting engine 506 has selected the best alternate tunnel(s), potentially on a per-application basis, rerouting engine 506 may reroute the traffic onto those tunnel(s), in advance of the primary tunnel failing. In some cases, rerouting engine 506 may even opt to allow certain applications to drop, based on the application matching.

In various embodiments, architecture 500 may also include rerouting performance monitor 508 that is responsible for actively learning the rerouting effectiveness from the decisions taken by rerouting engine 506. Then, if rerouting performance monitor 508 determines that the application performance is below an acceptable level, it may deem the rerouting of that traffic onto the alternate tunnel as a failure. In such cases, rerouting performance monitor 508 may instruct rerouting engine 506 not to reroute tunnels and applications with such characteristics.

To track the performance of any rerouting by rerouting engine 506, rerouting performance monitor 508 may track the traffic that was rerouted from tunnel X onto tunnel Y at time t. Then, rerouting performance monitor 508 may track monitor tunnel Y for any flapping. If tunnel Y often flaps after traffic was rerouted onto that tunnel, then the decision can be taken by rerouting performance monitor 508 not to reroute traffic onto tunnel Y anymore. In other words, rerouting performance monitor 508 may blacklist tunnel Y from being eligible for receiving rerouted traffic by rerouting engine 506. To do so, rerouting performance monitor 508 may monitor the distribution of flaps exhibited by tunnel Y, both before and after the traffic was rerouted. If there was a significant increase in the number of flaps after the reroute (e.g., with a significant p-value), then rerouting performance monitor 508 may blacklist rerouting traffic onto tunnel Y or, in some cases, from being rerouted from tunnel X to tunnel Y.

In another embodiment, rerouting performance monitor 508 may mark each rerouted flow as 'rerouted.' Doing so allows rerouting performance monitor 508 to measure any degradation of application performance by comparing its pre-rerouting and post-rerouting performances (e.g., by using a similarity test, such as a two-sample hypothesis test). This can be done by leveraging a DPI engine that measures application level traffic information and session terminations. In addition, rerouting performance monitor 508 may also receive traffic metrics from other routers, such as TCP RTT times, and the like, to assess any application performance degradation.

Another key aspect of the techniques herein is the ability of the system to revert traffic back to the failed link/tunnel. While some routing protocols are revertive in nature by considering the original link/tunnel eligible again for traffic, once it comes back, this can be particularly disruptive in the case of a flappy link/tunnel. Indeed, returning the traffic back to a tunnel that exhibits flapping behavior can lead to even more traffic disruptions, as that tunnel has a high probability of failing again. In some cases, it may even be preferable to keep the traffic on the sub-optimal tunnel. Accordingly, rerouting performance monitor 508 may leverage flap behavior predictor 504 to predict whether the original link/tunnel is likely to fail, then recover, then fail again. Such a metric could be taken into account by edge device 308a to decide whether a restored link/tunnel should be reused after recovering immediate or after the expiration of a time period P, after which the probability of flapping falls below a given value.

Figure 9:
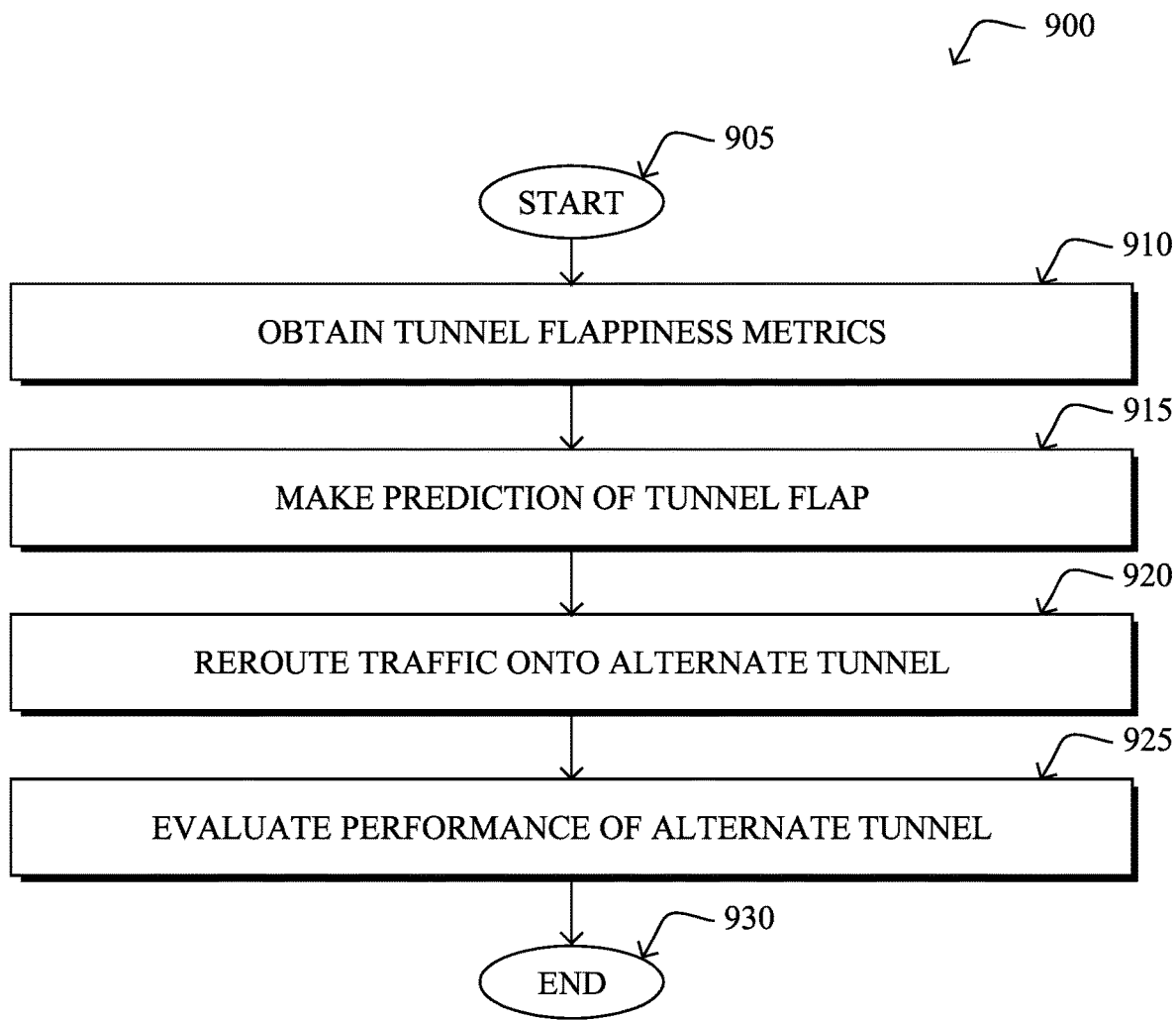
FIG. 9 illustrates an example simplified procedure for using a flappiness metric to limit traffic disruption in WANs.

FIG. 9 illustrates an example simplified procedure for the event triggered prediction of a failure in a network, in accordance with one or more embodiments described herein. For example, a non-generic, specifically configured device (e.g., device 200) may perform procedure 900 by executing stored instructions (e.g., process 248). For example, the device may be an edge router of an SD-WAN or a device that provides a supervisory service for an SD-WAN, to implement predictive routing in the network. As shown, the procedure 900 my start at step 905 and continue on to step 910 where, as described in greater detail above, the device obtains tunnel flappiness metrics associated with a particular tunnel in the network exhibiting flapping. For instance, such metrics may be indicative of the number of flaps exhibited by the particular tunnel in a certain time span, the amount of traffic on the particular tunnel, resource usage by the device (e.g., CPU load, memory load, etc.), the number of tunnels located between the device and an endpoint of the particular tunnel that exhibit flapping, or other suitable metrics.

At step 915, as detailed above, the device may make a prediction that the particular tunnel is going to flap, based on the tunnel flappiness metrics. In various embodiments, the prediction may be made using a machine learning model. This can be done either locally on the device itself or by having the device send the tunnel flappiness metrics to a supervisory service and receiving the prediction from the supervisory service, in response. In the case of local predictions, the model itself may be trained directly on the device or received from the supervisory service. In some embodiments, the prediction may indicate not only that the tunnel is going to fail or flap, but also the amount of time that the tunnel is likely to be down. The model itself may take the form of a regression model or other form of machine learning capable of making these predictions.

At step 920, the device may proactively reroute, based on the prediction, traffic from the particular tunnel onto an alternate tunnel, prior to the particular tunnel flapping, as described in greater detail above. In some embodiments, the device may do so by matching traffic sent via the particular tunnel for a given application to an alternate tunnel, based on a determination that the alternate tunnel will satisfy a quality of service (QoS) associated with the given application.

At step 925, as detailed above, the device may evaluate the performance of the alternate tunnel, after proactively rerouting the traffic from the particular tunnel onto the alternate tunnel. In some embodiments, the device may do so by determining that the alternate tunnel does not satisfy the QoS associated with the given application and, in response, rerouting the traffic back onto the particular tunnel. In another embodiment, the device may reroute the traffic back onto the particular tunnel, if it determines that the alternate tunnel does not satisfy the QoS associated with the application rerouted onto the alternate tunnel. In yet another embodiment, the device may determine that the alternate tunnel exhibits flapping after rerouting the traffic onto the alternate tunnel and, in response, blacklist the alternate tunnel from receiving rerouted traffic from the particular tunnel. Thus, by evaluating the effects of the reroute, the rerouting mechanism will become more smarter over time and learn to make better rerouting decisions. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce systems and methods to predict the flappiness behavior of a tunnel and, potentially, its associated edge router, as well. To do so, various metrics such as flap downtimes and probability of future flaps are learned using machine learning methods based on the history. In further aspects, the techniques herein also introduce methods for application-specific rerouting that predicts whether the performance of the application will degrade if rerouted onto an alternate tunnel. Application SLA and other network indicators can also be used to make this evaluation. In other aspects, the techniques herein also allow the traffic for different applications to be rerouted onto different alternate tunnels. In further aspects, the performance of any rerouting actions is actively learned by monitoring what happens after the traffic is rerouted. Statistical techniques are also introduced herein to quantify the effectiveness of the rerouting.

While there have been shown and described illustrative embodiments that provide for predictive routing in a network, such as an SD-WAN, it is to be understood that various other adaptations and modifications may be made within the spirit and scope of the embodiments herein. For example, while certain embodiments are described herein with respect to using certain models for purposes of predicting failures or flapping behaviors, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a device, tunnel flappiness metrics associated with a particular tunnel in a wide area network (WAN) that is exhibiting flapping in which the particular tunnel oscillates between down and up states;
   making, by the device and based on the tunnel flappiness metrics, a prediction that the particular tunnel is going to flap, wherein the prediction is made using a machine learning model that is trained using the tunnel flappiness metrics to model a flapping behavior of the particular tunnel;
   proactively rerouting, by the device and based on the prediction, traffic from the particular tunnel onto an alternate tunnel, prior to the particular tunnel flapping; and
   evaluating, by the device, performance of the alternate tunnel, after proactively rerouting the traffic from the particular tunnel onto the alternate tunnel.

2. The method as in claim 1, wherein the tunnel flappiness metrics are indicative of at least one of: a number of flaps exhibited by the particular tunnel in a certain time span, an amount of traffic on the particular tunnel, resource usage by the device, or a number of tunnels located between the device and an endpoint of the particular tunnel that exhibit flapping.

3. The method as in claim 1, wherein the device is an edge router in the WAN.

4. The method as in claim 1, wherein proactively rerouting traffic from the particular tunnel onto the alternate tunnel comprises:
matching traffic sent via the particular tunnel for a given application to an alternate tunnel, based on a determination that the alternate tunnel will satisfy a quality of service (QoS) associated with the given application.

5. The method as in claim 4, wherein evaluating the performance of the alternate tunnel further comprises:
determining that the alternate tunnel does not satisfy the QoS associated with the given application; and, in response,
rerouting the traffic back onto the particular tunnel.

6. The method as in claim 1, wherein evaluating the performance of the alternate tunnel comprises:
determining that the alternate tunnel exhibits flapping, after rerouting the traffic onto the alternate tunnel; and, in response,
blacklisting the alternate tunnel from receiving rerouted traffic from the particular tunnel.

7. The method as in claim 1, wherein making the prediction that the particular tunnel is going to flap comprises:
sending the tunnel flappiness metrics to a supervisory service; and
receiving the prediction from the supervisory service.

8. The method as in claim 1, wherein the prediction indicates an amount of time that the particular tunnel is likely to be down.

9. The method as in claim 1, wherein the machine learning model is a regression model.

10. The method as in claim 1, further comprising:
receiving, at the device, the machine learning model from a supervisory service.

11. An apparatus, comprising:
one or more network interfaces to communicate with a network;
a processor coupled to the one or more network interfaces and configured to execute one or more processes; and
a memory configured to store a process that is executable by the processor, the process when executed configured to:
obtain tunnel flappiness metrics associated with a particular tunnel in a wide area network (WAN) that is exhibiting flapping in which the particular tunnel oscillates between down and up states;
make, based on the tunnel flappiness metrics, a prediction that the particular tunnel is going to flap, wherein the prediction is made using a machine learning model that is trained using the tunnel flappiness metrics to model a flapping behavior of the particular tunnel;
proactively reroute, based on the prediction, traffic from the particular tunnel onto an alternate tunnel, prior to the particular tunnel flapping; and
evaluate performance of the alternate tunnel, after proactively rerouting the traffic from the particular tunnel onto the alternate tunnel.

12. The apparatus as in claim 11, wherein the tunnel flappiness metrics are indicative of at least one of: a number of flaps exhibited by the particular tunnel in a certain time span, an amount of traffic on the particular tunnel, resource usage by the apparatus, or a number of tunnels located between the apparatus and an endpoint of the particular tunnel that exhibit flapping.

13. The apparatus as in claim 11, wherein the apparatus is an edge router in the WAN.

14. The apparatus as in claim 11, wherein the apparatus proactively reroutes traffic from the particular tunnel onto the alternate tunnel by:
matching traffic sent via the particular tunnel for a given application to an alternate tunnel, based on a determination that the alternate tunnel will satisfy a quality of service (QoS) associated with the given application.

15. The apparatus as in claim 14, wherein the apparatus evaluates the performance of the alternate tunnel further by:
determining that the alternate tunnel does not satisfy the QoS associated with the given application; and, in response,
rerouting the traffic back onto the particular tunnel.

16. The apparatus as in claim 11, wherein the apparatus evaluates the performance of the alternate tunnel by:
determining that the alternate tunnel exhibits flapping, after rerouting the traffic onto the alternate tunnel; and, in response,
blacklisting the alternate tunnel from receiving rerouted traffic from the particular tunnel.

17. The apparatus as in claim 11, wherein the apparatus makes the prediction that the particular tunnel will flap by:
sending the tunnel flappiness metrics to a supervisory service; and
receiving the prediction from the supervisory service.

18. The apparatus as in claim 11, wherein the prediction indicates an amount of time that the particular tunnel is likely to be down.

19. The apparatus as in claim 11, wherein the process when executed is further configured to:
receive the machine learning model from a supervisory service.

20. A tangible, non-transitory, computer-readable medium storing program instructions that cause a device in a network to execute a process comprising:
obtaining, by the device, tunnel flappiness metrics associated with a particular tunnel in a wide area network (WAN) that is exhibiting flapping in which the particular tunnel oscillates between down and up states;
making, by the device and based on the tunnel flappiness metrics, a prediction that the particular tunnel is going to flap, wherein the prediction is made using a machine learning model that is trained using the tunnel flappiness metrics to model a flapping behavior of the particular tunnel;
proactively rerouting, by the device and based on the prediction, traffic from the particular tunnel onto an alternate tunnel, prior to the particular tunnel flapping; and
evaluating, by the device, performance of the alternate tunnel, after proactively rerouting the traffic from the particular tunnel onto the alternate tunnel.

* * * * *

UNITED STATES PATENT AND TRADEMARK OFFICE
CERTIFICATE OF CORRECTION

| | |
|---|---|
| PATENT NO. | : 11,343,171 B2 |
| APPLICATION NO. | : 16/856399 |
| DATED | : May 24, 2022 |
| INVENTOR(S) | : Jean-Philippe Vasseur et al. |

It is certified that error appears in the above-identified patent and that said Letters Patent is hereby corrected as shown below:

In the Specification

Column 11, Line 32, please amend as shown:
the failure probability $P_f$ (which can be a simple flag, a Column 11, Line 34, please amend as shown:
The device 308 may use $P_f$ to determine the appropriate Column 14, Line 32, please amend as shown:
tunnels, approximately 220,000 of the total set, exhibited no Column 15, Line 31, please amend as shown:
such features may include numFlapsInLast1Minute, Column 15, Line 32, please amend as shown:
numFlapsInLast5Minutes Column 15, Line 35, please amend as shown:
rationInLast1Minute, medianFlapDurationInLast5

Column 16, Line 32, please amend as shown:
live networks. For instance, FIGS. 8A-8E illustrate example Column 17, Line 43, please amend as shown:
Predict Flappiness: Rerouting engine 506 may then call Signed and Sealed this
Twenty-second Day of November, 2022

Katherine Kelly Vidal
*Director of the United States Patent and Trademark Office*